(12) United States Patent
Lee et al.

(10) Patent No.: US 11,605,244 B2
(45) Date of Patent: Mar. 14, 2023

(54) ROBOT FOR AUTOMATICALLY FOLLOWING A PERSON

(71) Applicant: LG ELECTRONICS INC., Seoul (KR)

(72) Inventors: Junghyun Lee, Seoul (KR); Sunggil Park, Seoul (KR); Dongmyung Shin, Seoul (KR); Hyeongshin Jeon, Seoul (KR); Hyukdoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 15/883,841

(22) Filed: Jan. 30, 2018

(65) Prior Publication Data
US 2018/0213994 A1   Aug. 2, 2018

(30) Foreign Application Priority Data

Jan. 31, 2017   (KR) .................. 10-2017-0014093

(51) Int. Cl.
*G06T 7/50*   (2017.01)
*G06T 7/11*   (2017.01)
(Continued)

(52) U.S. Cl.
CPC ........... *G06V 40/20* (2022.01); *G05D 1/0088* (2013.01); *G05D 1/0246* (2013.01);
(Continued)

(58) Field of Classification Search
CPC combination set(s) only.
See application file for complete search history.

(56) References Cited

U.S. PATENT DOCUMENTS 8,170,280 B2 *   5/2012   Zhao .................. G06K 9/00711
382/103
8,613,125 B2   12/2013   Jeong et al.
(Continued)

FOREIGN PATENT DOCUMENTS

JP   2004-147690   5/2004
JP   2016-059795   4/2016
(Continued)

OTHER PUBLICATIONS

International Search Report dated Apr. 24, 2018 issued in Application No. PCT/KR2018/001254.
(Continued)

*Primary Examiner* — Anne Marie Antonucci
*Assistant Examiner* — Amelia Vorce
(74) *Attorney, Agent, or Firm* — KED & Associates, LLP

(57) ABSTRACT

Disclosed is a cleaner. The cleaner includes a cleaner body, a suction nozzle configured to suck dust on a floor surface, and a suction hose configured to transfer the dust, transferred from the suction nozzle, to the cleaner body. The cleaner body includes a driving driver or motor moving the cleaner body, a depth sensor configured to obtain image information about an object near the cleaner body, and a processor configured to extract a foot sole region of a person, based on the obtained image information, obtain a moving point of the cleaner body, based on the extracted foot sole region, and control the driving driver to move the cleaner body to the obtained moving point.

16 Claims, 19 Drawing Sheets

(51) Int. Cl.
*G06T 7/194* (2017.01)
*G05D 1/00* (2006.01)
*G05D 1/02* (2020.01)
*G06V 40/20* (2022.01)

(52) U.S. Cl.
CPC ............ *G05D 1/0274* (2013.01); *G06T 7/11* (2017.01); *G06T 7/194* (2017.01); *G06T 7/50* (2017.01); *G05D 2201/0215* (2013.01); *G06T 2207/10024* (2013.01); *G06T 2207/10028* (2013.01); *G06T 2207/30196* (2013.01)

(56) References Cited

U.S. PATENT DOCUMENTS

| | | | | |
|---|---|---|---|---|
| 9,586,316 | B1* | 3/2017 | Swilling | B25J 9/1664 |
| 9,665,767 | B2* | 5/2017 | Guan | G06K 9/00355 |
| 10,016,896 | B2* | 7/2018 | Sinyavskiy | B25J 9/1676 |
| 2006/0064203 | A1* | 3/2006 | Goto | G05D 1/0246 |
| | | | | 700/245 |
| 2009/0048727 | A1 | 2/2009 | Hong et al. | |
| 2011/0026770 | A1* | 2/2011 | Brookshire | G06K 9/00805 |
| | | | | 382/103 |
| 2012/0051638 | A1* | 3/2012 | Kawai | G06V 10/50 |
| | | | | 382/170 |
| 2012/0120196 | A1* | 5/2012 | Tsai | G06T 7/194 |
| | | | | 348/46 |
| 2012/0274634 | A1* | 11/2012 | Yamada | G06T 7/187 |
| | | | | 345/419 |
| 2013/0084006 | A1* | 4/2013 | Zhang | G06T 7/11 |
| | | | | 382/173 |
| 2013/0243240 | A1* | 9/2013 | Marks | F24F 11/30 |
| | | | | 382/103 |
| 2014/0124004 | A1* | 5/2014 | Rosenstein | A47L 9/2852 |
| | | | | 134/18 |
| 2014/0139633 | A1* | 5/2014 | Wang | G06K 9/00778 |
| | | | | 348/46 |
| 2014/0249676 | A1 | 9/2014 | Florencio et al. | |
| 2015/0199816 | A1* | 7/2015 | Freeman | G06T 7/74 |
| | | | | 382/103 |
| 2015/0229906 | A1* | 8/2015 | Inacio De Matos | G01S 3/7864 |
| | | | | 348/46 |
| 2016/0074272 | A1 | 3/2016 | Ahn et al. | |
| 2016/0129593 | A1* | 5/2016 | Wolowelsky | B25J 5/00 |
| | | | | 700/253 |
| 2016/0193729 | A1* | 7/2016 | Williams | H04B 1/0092 |
| | | | | 700/258 |
| 2017/0206423 | A1* | 7/2017 | Ju | G06T 7/11 |
| 2017/0225054 | A1* | 8/2017 | Lim | A63B 69/3667 |
| 2017/0312916 | A1* | 11/2017 | Williams | G01C 21/20 |
| 2018/0000305 | A1* | 1/2018 | Schultink | A47L 5/225 |
| 2018/0020894 | A1* | 1/2018 | Sauer | A47L 5/22 |
| | | | | 15/319 |
| 2018/0068431 | A1* | 3/2018 | Takeda | G06T 7/70 |
| 2018/0129217 | A1* | 5/2018 | Asada | G05D 1/0214 |
| 2018/0144499 | A1* | 5/2018 | Watanabe | G06T 7/593 |
| 2018/0189565 | A1* | 7/2018 | Lukierski | G06T 7/579 |
| 2018/0208307 | A1* | 7/2018 | Boehme | B08B 1/002 |
| 2018/0253595 | A1* | 9/2018 | Aoki | G06K 9/00348 |
| 2018/0361581 | A1* | 12/2018 | Williams | B25J 9/1664 |
| 2020/0033860 | A1* | 1/2020 | Blankespoor | G05D 1/0088 |
| 2022/0066456 | A1* | 3/2022 | Ebrahimi Afrouzi | A47L 9/30 |

FOREIGN PATENT DOCUMENTS

| | | |
|---|---|---|
| KR | 10-0585709 | 6/2006 |
| KR | 10-0876698 | 11/2008 |
| KR | 10-1362373 | 2/2009 |
| KR | 10-2015-0057476 | 5/2015 |

OTHER PUBLICATIONS

Australian Office Action dated May 12, 2020 issued in AU Application No. 2018216517.
European Search Report dated Mar. 1, 2021 issued in EP Application No. 18748553.7.

* cited by examiner

FOREGROUND/BACKGROUND REGION SEPARATION

ROBOT FOR AUTOMATICALLY FOLLOWING A PERSON

CROSS-REFERENCE TO RELATED APPLICATION

This application claims priority under 35 U.S.C. § 119 Korean Application No. 10-2017-0014093, filed on Jan. 31, 2017, whose entire disclosure is hereby incorporated by reference.

BACKGROUND

1. Field

The present disclosure relates to a cleaner, and more particularly, to a cleaner for automatically following a person.

2. Background

Generally, cleaners are apparatuses which suck dust-containing air by using a sucking force generated by a suction motor equipped in a body thereof, and then, filter out the dust in the body. The cleaners are categorized into hand-operated cleaners and automatic cleaners. The hand-operated cleaners are cleaners where a user directly moves a cleaner to perform cleaning. The automatic cleaners are cleaners which perform cleaning while self-driving.

The hand-operated cleaners may be categorized into a canister type, where a suction nozzle is provided separately from a cleaner body and is connected to an extension pipe, and an upright type where a suction nozzle is coupled to a body. In a related art hand-operated cleaner, since a user should drag the cleaner with power, a burden is applied to a wrist or a waist.

Moreover, when a user constrainedly pulls a cleaner body connected to a suction hose by using a handle, the suction hose is separated from the cleaner body. In order to such a problem, technology where a cleaner automatically follows a person has been developed. For example, a related art cleaner may measure a direction and a distance between a user and the cleaner by using an ultrasonic sensor, and thus, a cleaner body may follow the user. However, in a case of using the ultrasonic sensor, the distance cannot be accurately measured due to a characteristic of an ultrasonic wave, the cleaner can collide with the user, and it is unable to accurately detect an obstacle.

Moreover, Korean Patent Registration No. 10-0585709 discloses technology where an infrared camera attached on a cleaner senses a temperature distribution of a heat source, and the cleaner follows a target object, based on a result of the sensing. In this case, however, since the infrared sensor for sensing a human body is separately added, the cost increases, and if a user does not move, it is unable to sense the user, whereby it is unable to follow the user. Moreover, in a case where a distance to a user is measured through triangulation using a stereo camera, the number of arithmetic operations is large, and for this reason, a reaction velocity of a cleaner is slow.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Figure 1A:
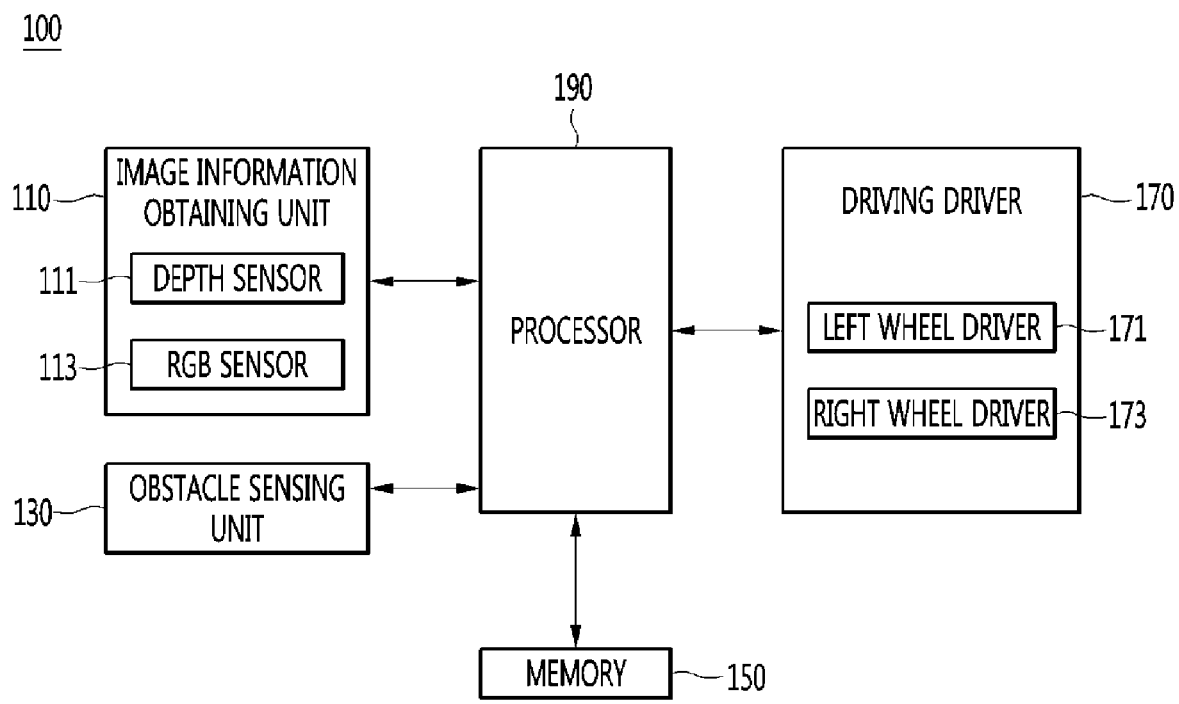
FIG. 1A is a block diagram for describing a configuration of a cleaner according to an embodiment of the present disclosure.

Hereinafter, embodiments disclosed in the present specification will be described with reference to the accompanying drawings. Like reference numerals refer to like elements, and overlapping descriptions are omitted. Suffixes "module" and "unit" of elements described herein are assigned or used in consideration of only easiness of description of the present specification, and have no meanings or roles distinguished from each other.

FIG. 1A is a block diagram for describing a configuration of a cleaner 100 according to an embodiment of the present disclosure. The cleaner 100 illustrated in FIG. 1A may be applied to all of a canister type cleaner including a suction hose and a robot type cleaner including no suction hose. This will be described below. Referring to FIG. 1A, the cleaner 100 according to an embodiment of the present disclosure may include an image information obtaining unit 110 (also referred to herein as an image sensor), an obstacle sensing unit (or obstacle sensor) 130, a memory 150, a driving driver (or a motor for applying a driving force) 170, and a processor 190.

The image information obtaining unit 110 may obtain image information which is information about an image near the cleaner 100. The image information obtaining unit 110 may include one or more of a depth sensor 111 and an RGB sensor 113.

The depth sensor 111 may sense light which is irradiated from a light emitting unit (not shown) and is reflected from an object. The depth sensor 111 may measure a distance to the object, based on a time difference taken until the reflected light is sensed and the amount of the reflected light. The depth sensor 111 may obtain two-dimensional (2D) image information or 3D image information about a region near the cleaner 100, based on the measured distance to the object.

The RGB sensor 113 may obtain color image information about an object near the cleaner 100. The color image information may be a photographing image of the object. The RGB sensor 113 may be referred to as an RGB camera. The image information obtaining unit 110 will be described below in detail.

The obstacle sensing unit 130 may sense an obstacle located near the cleaner 200. The obstacle sensing unit 130 may include an ultrasonic sensor, an infrared sensor, a laser sensor, a vision camera, and/or the like. The obstacle sensing unit 130 may include a camera which obtains an image by the laser sensor photographing a cleaning zone onto which a laser is irradiated.

The processor 190 may extract a laser light pattern from the image obtained through the camera and may generate a map of the cleaning zone and an obstacle situation of the cleaning zone, based on the changes in positions, shapes, and posture of the pattern in the image.

In FIG. 1A, the obstacle sensing unit 130 and the image information obtaining unit 110 are described as separate elements, but are not limited thereto. In other embodiments, the obstacle sensing unit 130 may be included in the image information obtaining unit 110 and may not be included in the cleaner 100. In this case, the image information obtaining unit 100 may sense an obstacle.

The memory 150 may store a plurality of person models including a leg gesture. The plurality of person models may each be 2D or 3D person model.

The driving driver 170 may move the cleaner 100 in a specific direction by a specific distance. The driving driver 170 may include a left wheel driver 171 for driving a left wheel of the cleaner 100 and a right wheel driver 173 for driving a right wheel of the cleaner 100. The left wheel driver 171 may include a motor for driving the left wheel, and the right wheel driver 173 may include a motor for driving the right wheel.

In FIG. 1A, an example where the driving driver 170 includes the left wheel driver 171 and the right wheel driver 173 is described, but the present embodiment is not limited thereto. In other embodiments, if one wheel is provided, only one driver may be provided.

The processor 190 may overall control an operation of the cleaner 100. The processor 190 may extract one or more person candidate regions, based on the image information obtained by the image information obtaining unit 110. The processor 190 may extract a person region from among the extracted one or more person candidate regions and may determine a position and a posture of a person (e.g., a user of the vacuum cleaner), based on the extracted person region.

The processor 190 may automatically select a moving point (or geographic location) to which the cleaner 100 is to be moved, based on the determined position and posture of the person. The processor 190 may control the driving driver 170 in order for the cleaner 100 to move to the selected moving point. Therefore, the cleaner 100 may follow the person to a position spaced apart from the person by a certain distance. For example, The processor 190 may independently control an operation of each of the left wheel driver 171 and the right wheel driver 173. Accordingly, the cleaner 100 may drive straight, back, or turn.

Figure 1B:
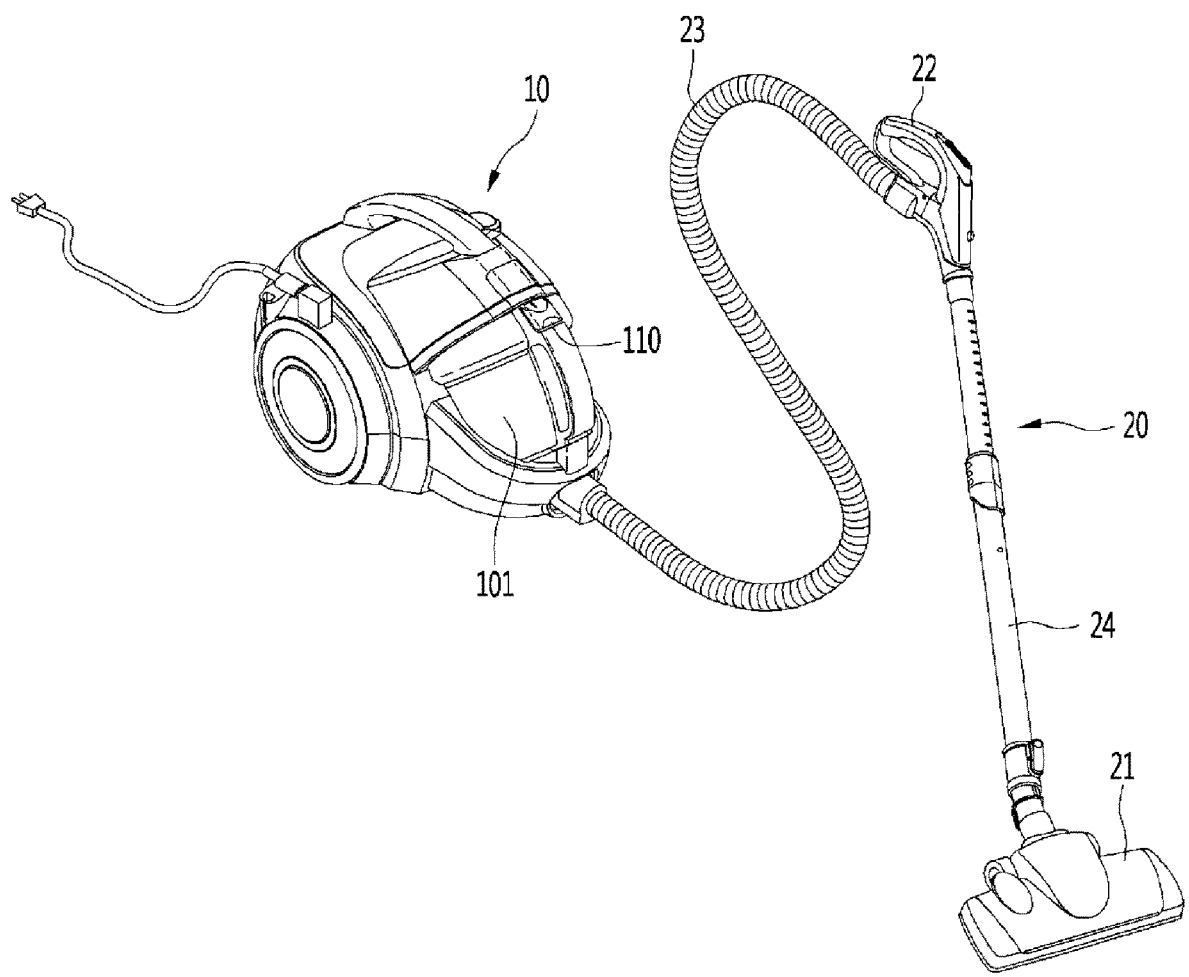
FIG. 1B is a diagram for describing a canister type cleaner according to an embodiment of the present disclosure.

The cleaner 100 according to the embodiment of FIG. 1A may be applied to all of a canister type cleaner or a robot type cleaner. FIG. 1B is a diagram for describing a canister type cleaner 100-1 according to an embodiment of the present disclosure. The canister type cleaner 100-1 may include a cleaner body 10 and a suction device (or cleaner head) 20.

The cleaner body 10 may include all of the elements of the cleaner 100 described above with reference to FIG. 1A. The cleaner body 10 may further include a dust separator (not shown), which separates air and dust sucked by the suction device 20, and a dust canister 101 which stores the dust separated by the dust separator.

The dust canister 101 may be detachably attached on the cleaner body 10. The dust separator may be manufactured as a separate device independent from the dust canister 101, or may be provided as one module with the dust canister 101.

The suction device 20 may be connected to the cleaner body 10 and may guide the air including the dust to the cleaner body 10. The suction device 20 may include a suction nozzle 21 for sucking dust and air on a floor surface and a plurality of connection units 22 to 24 for connecting the suction nozzle 21 to the cleaner body 10. The connection units 22 to 24 may include an extension pipe 24 connected to the suction nozzle 21, a handle 22 connected to the extension pipe 24, and a suction hose 23 connecting the handle 22 to the cleaner body 10.

The cleaner body 10 may include the image information obtaining unit 110. The image information obtaining unit 110 may be provided on an upper front surface of the cleaner body 10.

The cleaner body 10 may have a certain height. The certain height may be within a range from 15 cm to 30 cm, but this height is merely an example. In a case where the depth sensor 111 is provided on the upper front surface of the cleaner body 10, light may be irradiated downward, and thus, information about an image under a knee of a person located on the floor surface may be accurately extracted.

Figure 1C:
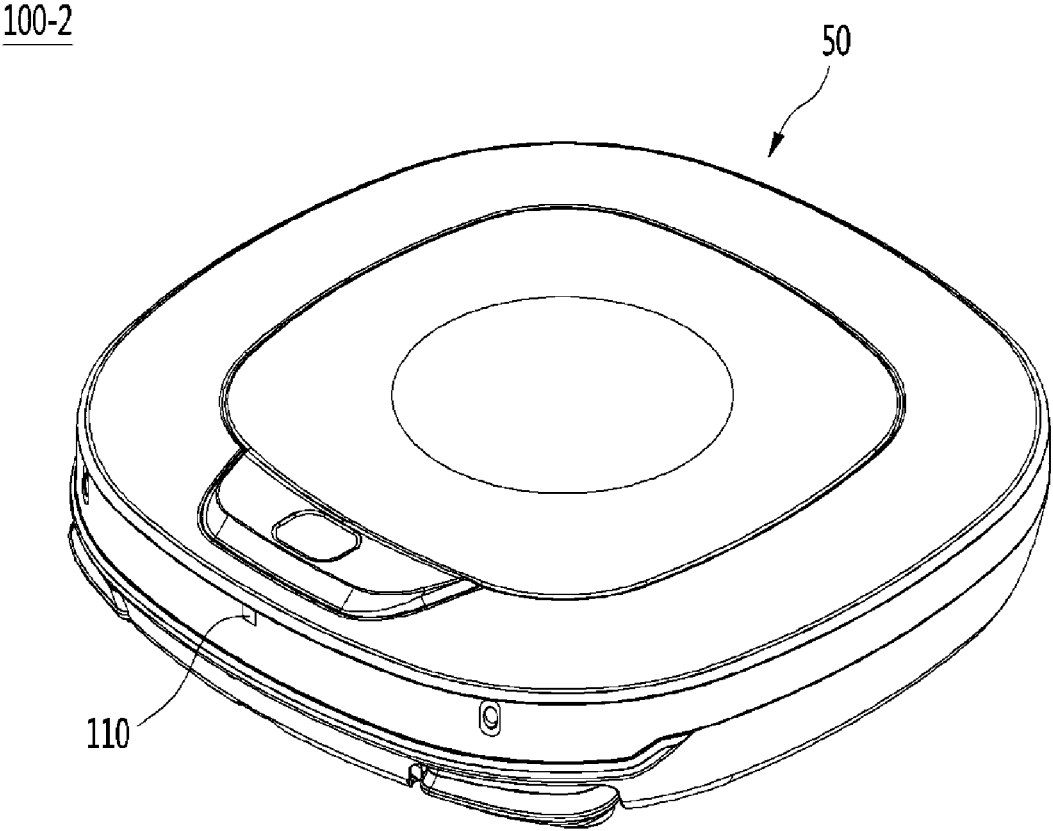
FIGS. 1C and 1D are diagrams for describing a robot type cleaner according to an embodiment of the present disclosure.
Figure 1D:
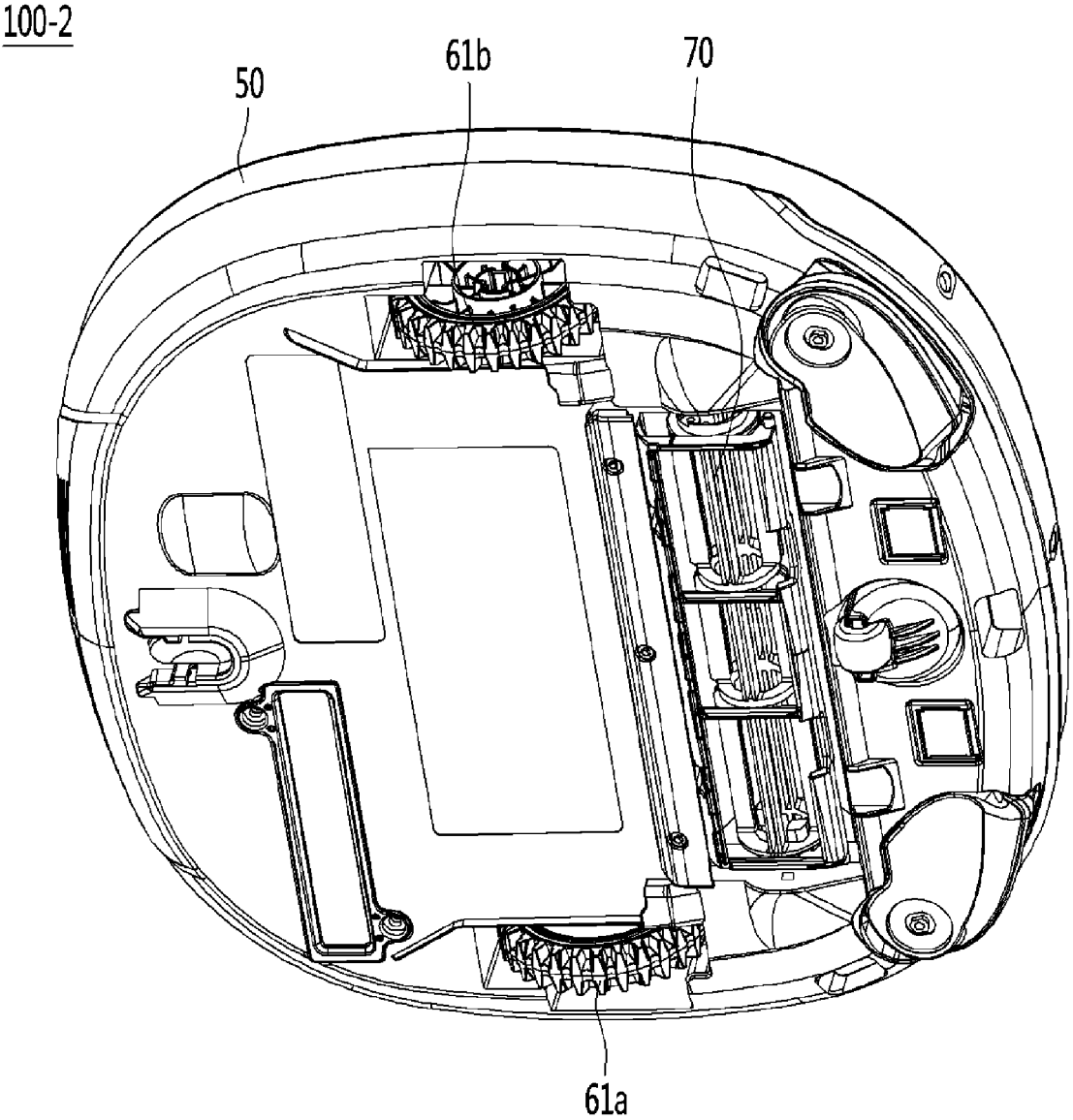

Hereinafter, the robot type cleaner will be described. FIGS. 1C and 1D are diagrams for describing a robot type cleaner 100-2 according to an embodiment of the present disclosure. Referring to FIGS. 1C and 1D, the robot type cleaner 100-2 may include a cleaner body 50, a left wheel 61a, a right wheel 61b, and a suction unit (or section head) 70. The cleaner body 50 may include all of the elements of the cleaner 100 described above with reference to FIG. 1.

Particularly, the robot type cleaner 100-2 may include an image information obtaining unit 110 including a depth sensor 111, which is provided in a front upper end of the robot type cleaner 100-2. Additionally, the robot type cleaner 200-2 may further include an RGB sensor 113.

The left wheel 61a and the right wheel 61b may drive the cleaner body 50. As the left wheel 61a and the right wheel 61b are rotated by the driving driver 170, the suction unit 70 may suck foreign materials such as dust or waste.

The suction unit 70 may be included in the cleaner body 50 and may suck dust on a floor surface. The suction unit 70 may further include a filter (not shown) for collecting foreign materials in sucked air and a foreign material storage unit (not shown) where the foreign materials collected by the filter are accumulated.

Figure 1E:
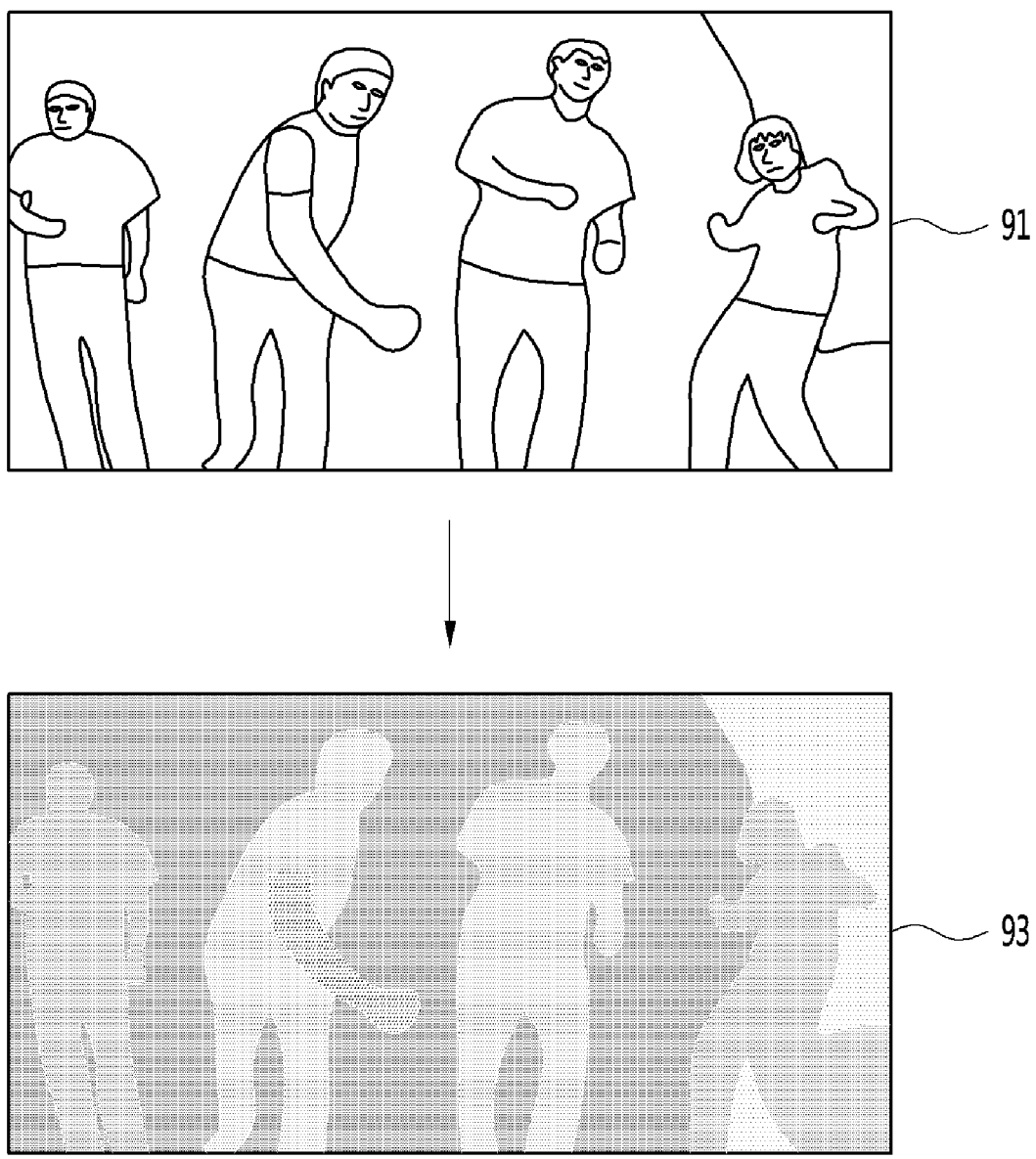
FIGS. 1E and 1F are diagrams for describing a structure of a depth sensor according to an embodiment of the present disclosure and the principle of obtaining image information.
Figure 1F:
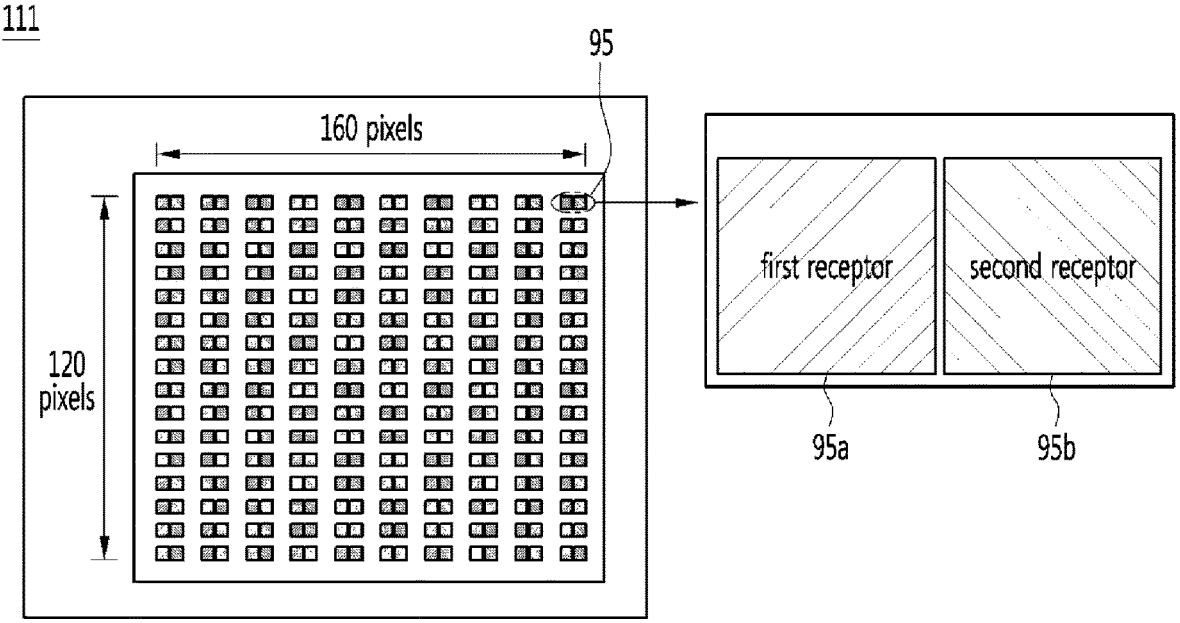

FIGS. 1E and 1F are diagrams for describing a structure of a depth sensor according to an embodiment of the present disclosure and the principle of obtaining image information. In FIGS. 1E and 1F, an example where the depth sensor is assumed as a time of flight (TOF) type depth sensor is described, but this is merely an example.

The TOF type depth sensor 111 may irradiate light, measure a time when the light is reflected, and measure a distance to an object, based on the measured time. The TOF type depth sensor 111 may measure the distance to the object, based on the amount of the reflected light. The TOF type depth sensor 111, as illustrated in FIG. 1E, may output image information including a depth image 93 of a real object 91 by using a TOF manner.

FIG. 1F illustrates an example of the TOF type depth sensor. The TOF type depth sensor 111, as illustrated in FIG. 1F, may include a light emitting unit (not shown) and a plurality of pixels 95 which senses light which is emitted from the light emitting unit and is reflected.

The light emitting unit may irradiate the light onto the outside at a certain time interval. The certain time interval may represent a turn-on/off interval of the light emitting unit.

Each of the plurality of pixels 95 may include a first receptor 95a and a second receptor 95b. The first receptor 95a may be activated while the light emitting unit is irradiating the light, and in an activated state, the first receptor 95a may receive the reflected light. The second receptor 95b may be activated while the light emitting unit does not irradiate the light, and in an activated state, the second receptor 95b may receive the reflected light.

If the first receptor 95a and the second receive 95b are activated with a time difference, a difference between the amount of light accumulated in the first receptor 95a and the amount of light accumulated in the second receptor 95b occurs depending on a distance to an object. The distance to the object may be measured based on the difference between the amounts of the lights.

The TOF type depth sensor 111 may convert a real object 91 into a depth image 93 illustrated in FIG. 1E, based on the measured distance and may output the depth image 93. The depth image 93 may be used to extract a person candidate region.

Figure 2:
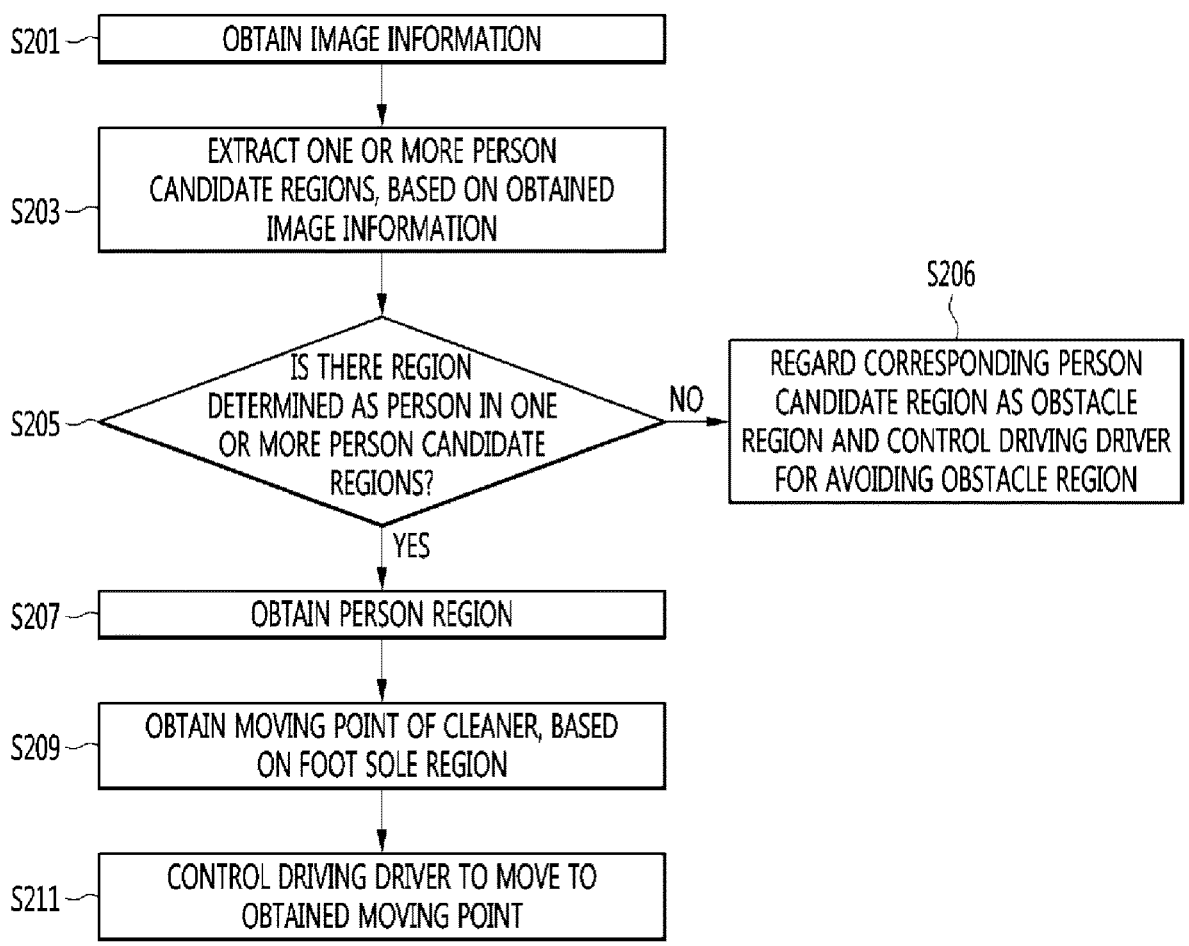
FIG. 2 is a flowchart for describing an operating method of a cleaner according to an embodiment of the present disclosure.

FIG. 2 is a flowchart for describing an operating method of a cleaner according to an embodiment of the present disclosure. Hereinafter, an operating method of a cleaner according to the embodiment of FIG. 2 will be described with reference to FIGS. 1 and 2.

In operation S201, the image information obtaining unit 110 of the cleaner 100 may obtain image information which is information about an image near the cleaner 100. In an embodiment, the image information obtaining unit 110 may include one or more of the depth sensor 111 and the RGB sensor 113.

In a case where light is irradiated in units of pixels, the depth sensor 111 may sense reflected light to obtain distance data between the depth sensor and an object. The processor 190 may obtain 3D image information, based distance data obtained by the depth sensor 111. The 3D image information may be used to extract a person candidate region.

According to another embodiment of the present disclosure, the RGB sensor 133 may be additionally used for obtaining image information. The RGB sensor 113 may obtain color image information about an object near the cleaner 100. In a case where the person candidate region is not extracted from the image information obtained by the depth sensor 111, the RGB sensor 113 may be used. That is, the RGB sensor 113 may complement the depth sensor 113.

In a case where the person candidate region is not extracted from the image information obtained by the depth sensor 111, the RGB sensor 113 may be used. That is, the RGB sensor 113 may complement the depth sensor 113. That is, in a case where the person candidate region is not extracted from the image information obtained by the depth sensor 111, the person candidate region may be extracted by using the color image information obtained by the RGB sensor 113.

A case where the depth sensor 111 does not extract the person candidate region may be a case where sunlight and external light are directly irradiated onto a light emitting unit of the depth sensor 111. As another example, a case where the depth sensor 111 does not extract the person candidate region may be a case where the depth sensor 111 is very close to an object, or a light saturation occurs because a degree of light reflection of the object is large.

The person candidate region may be extracted through the RGB sensor 113 regardless of a change in external environment where the depth sensor 111 is impossible to use. On the other hand, in a case where the person candidate region is not extracted from color image information obtained by the RGB sensor 113, the processor 190 may extract the person candidate region, based on distance data obtained by the depth sensor 111.

A case where the person candidate region is not extracted from the color image information obtained by the RGB sensor 113 may be a case where ambient illuminance is less than predetermined illuminance like light being turned off, and thus, the person candidate region cannot be extracted through photographing. In a case where the depth sensor 111 and the RGB sensor are all used for obtaining image information, one sensor may complement the other sensor, and thus, an ability to detect the person candidate region is enhanced.

In operation S203, the processor 190 of the cleaner 100 may extract one or more person candidate regions, based on the obtained image information. The processor 190 may separate a background region from a foreground region to extract the person candidate region, based on the obtained image information. In another embodiment, the processor 190 may remove a floor surface region from the separated foreground region to extract the person candidate region.

In another embodiment, if RGB information is included in the obtained image information, the processor 190 may extract the person candidate region by using a histogram of oriented gradient (HOG)-based person recognition algorithm. The RGB information may be a color image obtained by the RGB sensor 113.

The HOG-based person recognition algorithm may be an algorithm technique which obtains a histogram with respect to directions of edge pixels of a plurality of pixels which divide a color image, and recognizes a person region included in the color image. Here, the edge pixels may be pixels where a slope size is equal to or greater than a certain size. The processor 190 may extract a minimum of two or more person candidate regions by using the obtained image information.

Figure 3:
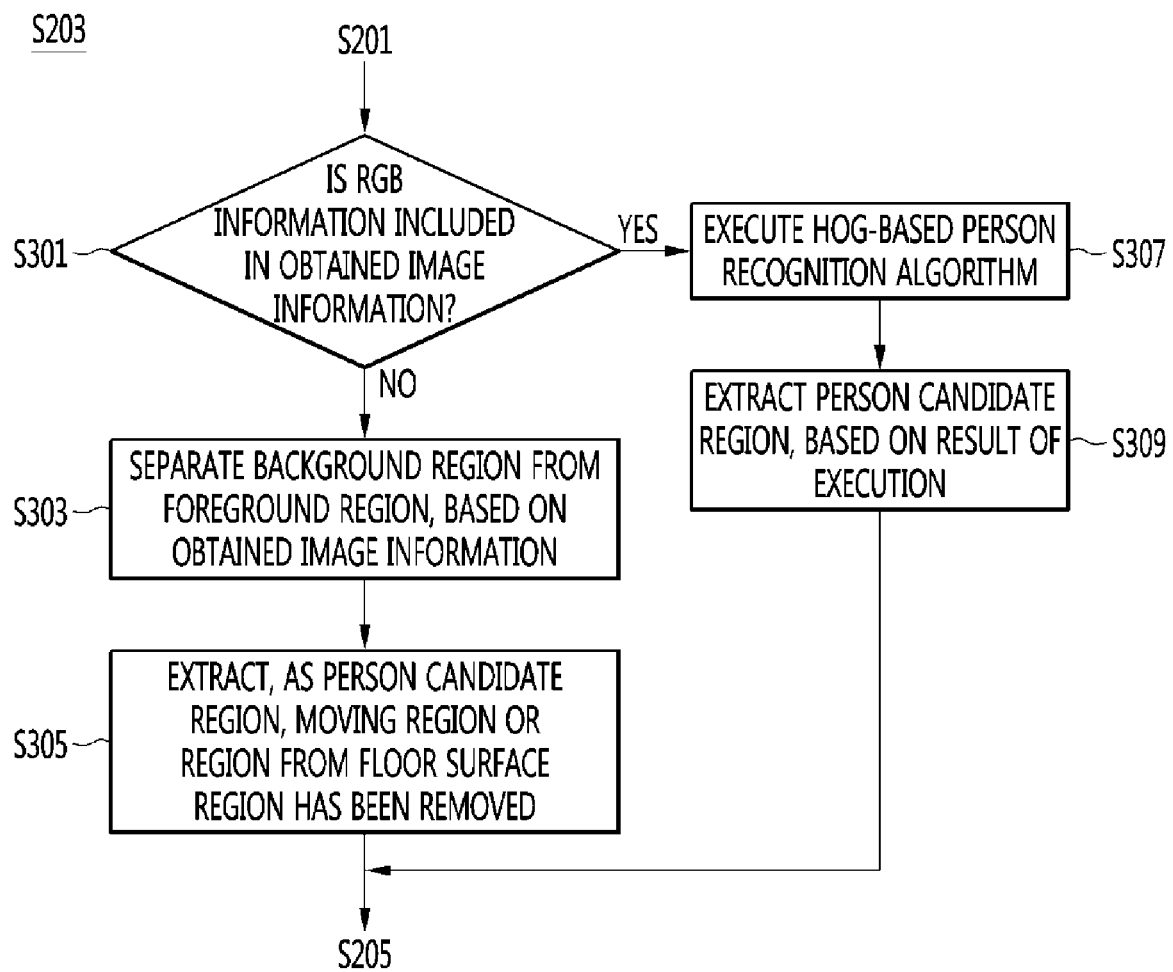
FIG. 3 is a flowchart for describing a process of extracting a person candidate region, based on image information obtained according to an embodiment of the present disclosure.

Hereinafter, operation S203 will be described with reference to the drawings. FIG. 3 is a flowchart for describing a process of extracting a person candidate region, based on image information obtained according to an embodiment of the present disclosure. Particularly, FIG. 3 is a diagram illustrating details of operation S203 of FIG. 2.

Referring to FIG. 3, in operation S301, the processor 190 may whether the obtained image information includes RGB information. When it is determined that the obtained image information does not include the RGB information, the processor 190 may separate a background region from a foreground region, based on the obtained image information in operation S303.

In this case, the processor 190 may extract a person candidate region by using only the depth sensor. That is, when image information does not include RGB information, corresponding image information may be depth information sensed by the depth sensor. The depth information may include distance data representing a distance between the depth sensor and an ambient object.

Figure 4:
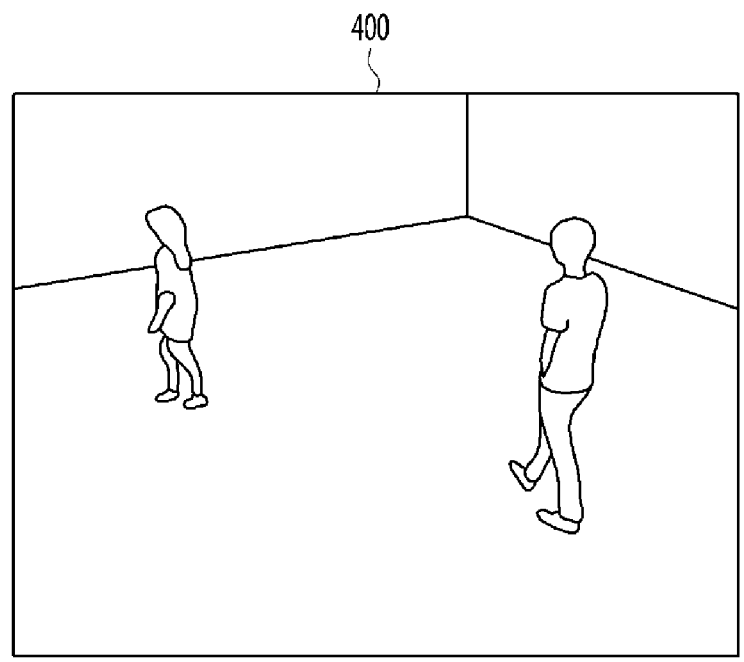
FIG. 4 is a diagram for describing an example of separating a foreground region and a background region, based on image information obtained according to an embodiment of the present disclosure.
Figure 4:
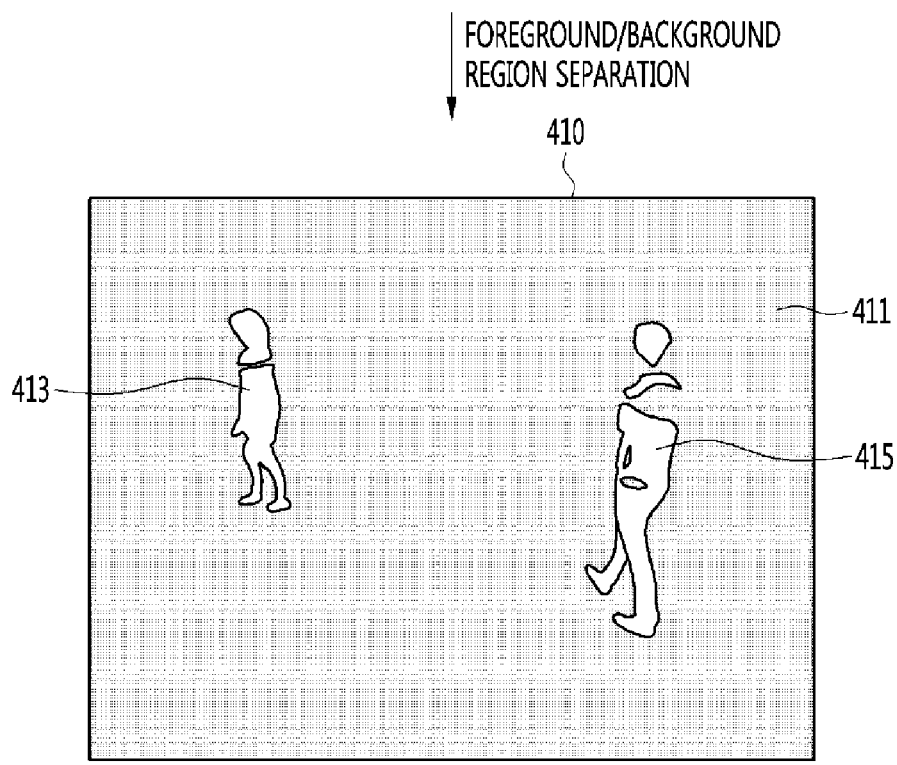

Operation S303 will be described with reference to FIG. 4. FIG. 4 is a diagram for describing an example of separating a foreground region and a background region, based on image information obtained according to an embodiment of the present disclosure.

Referring to FIG. 4, a real image 400 located in front of the cleaner 100 is illustrated. The depth sensor of the image information obtaining unit 110 may obtain image information corresponding to the real image 400.

A preprocessor (not shown) included in the processor 190 may preprocess the obtained image information to obtain a foreground region 410 corresponding to a whole portion of the real image 400. In this process, the preprocessor may remove noise from the image information and may obtain the foreground region 410 from which the noise has been removed.

The foreground region 410 may include a background region 411 which does not include object regions 413 and 415. The preprocessor may separate the background region 411, which does not include the object regions 413 and 415, from the foreground region 410.

FIG. 3 will be described again. In operation S305, the processor 190 may extract, as a person candidate region, a moving region of the foreground region from which the background region has been separated or a region, from a floor surface region has been removed, of the foreground region.

In an embodiment, the processor 190 may extract, as person candidate regions, moving regions of the foreground region from which the background has been separated. Referring to FIG. 4, the processor 190 may extract object regions 413 and 415, where there is movement, of the foreground region 410 from which the background 411 has been separated.

When the object regions 413 and 415 have been moved, the processor 190 may extract each of the object regions 413 and 415 as a person candidate region, based on first image information obtained at a first time and second image information obtained at a second time. Here, the second time may be a time which is later than the first time. For example, when one of the object regions 413 and 415 is located at the same position at the first time and the second time, the processor 190 may not extract a corresponding region as a person candidate region.

In another embodiment, when a background region is limited to a floor surface region, the processor 190 may separate the floor surface region from a foreground region and may remove the separated floor surface region. The processor 190 may extract, as a person candidate region, a region having movement in a region remaining after the floor surface region is removed.

When the obtained image information includes the RGB information, the processor 190 may execute the HOG-based person recognition algorithm in operation S307, and may extract a person candidate region, based on a result of the execution in operation S309. The processor 190 may execute the HOG-based person recognition algorithm by using the RGB information obtained through the RGB sensor.

The processor 190 may execute the HOG-based person recognition algorithm that, as described above, may be an algorithm technique which obtains a histogram with respect to directions of edge pixels of a plurality of pixels which divide a color image corresponding to RGB information, and recognizes a person region included in a target region.

In operations S301 to S307, the processor 190 may extract a minimum of two or more person candidate regions. Since the two or more person candidate regions are extracted, a person region is more accurately extracted.

FIG. 2 will be described again. The processor 190 may determine whether there is a region determined as a person in the extracted one or more person candidate regions in operation S205, and may obtain a person region, based on a result of the determination in operation S207.

In an embodiment, the processor 190 may convert the extracted person candidate region into 3D coordinates to obtain a 3D person candidate region. The processor 190 may match the 3D person candidate region with a 3D person model stored in the memory 150 to determine whether the 3D person candidate region is a person region. The 3D person model may be a model including a leg gesture of a person.

The memory 150 may store 3D person models corresponding to various leg gestures (such as a movements of a user's legs when walking and/or controller the cleaner). When the 3D person candidate region matches the 3D person model as a result of the matching, the processor 190 may determine a corresponding person candidate region as a person region.

A 3D person model will be described with reference to FIG. 5. When there is a region, which is not determined as a person, of the extracted one or more person candidate regions, the processor 190 may regard a corresponding person candidate region as an obstacle region and may control the driving driver for avoiding the obstacle region in operation S206.

When the 3D person candidate region does not match the 3D person model as a result of the matching, the processor 190 may determine a corresponding person candidate region as an obstacle which is not a person region. When a person candidate region is determined as an obstacle, the processor 190 may control driving of the cleaner 100 so as to avoid the obstacle.

Figure 5:
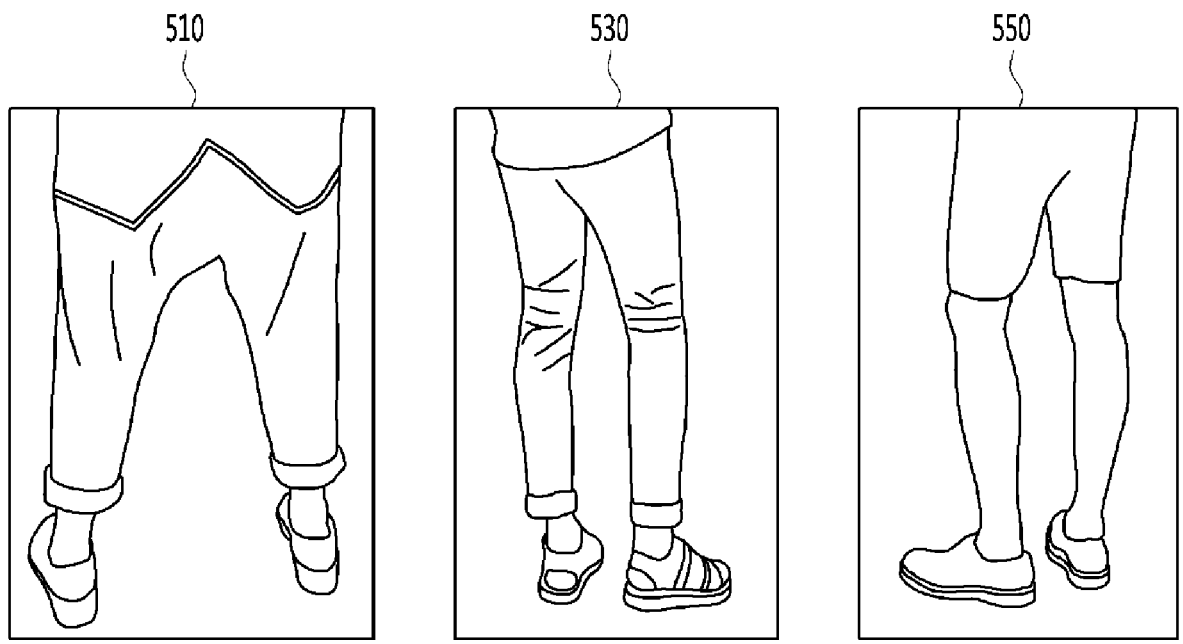
FIG. 5 illustrates an example of a three-dimensional (3D) person model stored in a memory according to an embodiment of the present disclosure.

FIG. 5 illustrates an example of a 3D person model stored in a memory according to an embodiment of the present disclosure. The memory 150 of the cleaner 100 may store a plurality of 3D person models 510, 530, and 550. Each of dimensional person models may have a shape including a leg pair corresponding to a back appearance of a person.

The processor 190 may compare an extracted person candidate region with each of the 3D person models 510, 530, and 550 stored in the memory 150. When a matching rate between the extracted person candidate region and a pre-stored 3D person model is equal to or higher than a predetermined matching rate, the processor 190 may determine the extracted person candidate region as a person region. When it is determined that the person candidate region is not the person region, the processor 190 may recognize the person candidate region as an obstacle region.

FIG. 2 will be described again. The processor 190 may obtain a moving point of the cleaner 100, based on a foot sole region (e.g., locations and/or orientations of the person's feet) extracted from the obtained person region in operation S209, and may control the driving driver 170 in order for the cleaner 100 to move to the obtained moving point in operation S211.

In an embodiment, the processor 190 may extract the foot sole region from the person region and may obtain the moving point of the cleaner 100 by using the extracted foot sole region. The moving point of the cleaner 100 may be a point to which the cleaner 100 needs to move, so as to follow a person according to a moving direction of the person.

Particularly, the moving point of the cleaner 100 may be a minimum distance which is necessary for following a person without disturbing a movement of the person. If the cleaner 100 is a canister type, the processor 100 may control the driving driver 170 to move the cleaner body 10 to the obtained moving point.

Figure 6:
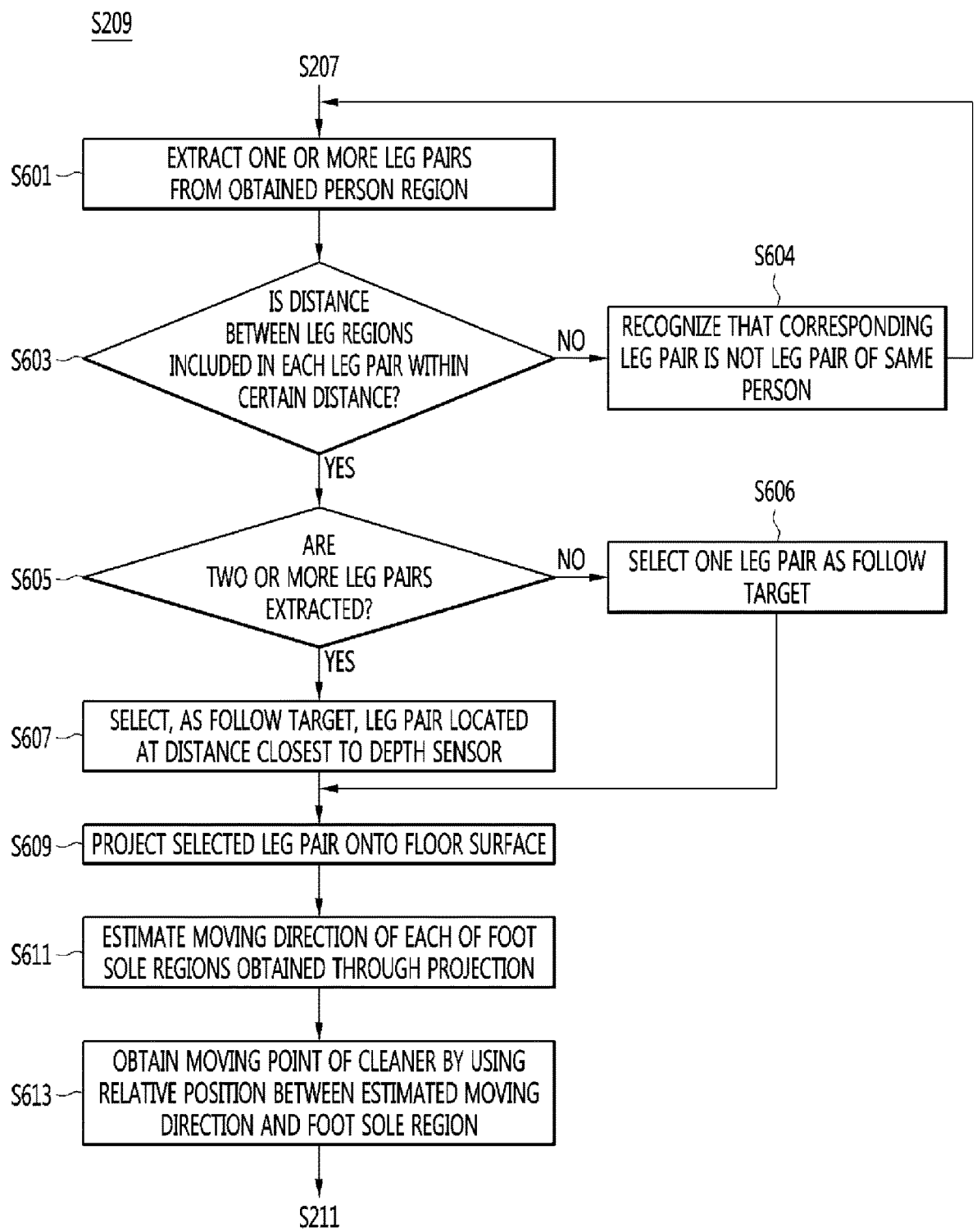
FIG. 6 is a flowchart for describing an example of obtaining a moving point of a cleaner from an obtained person region according to an embodiment of the present disclosure.

Operation S209 will be described with reference to FIG. 6. FIG. 6 is a flowchart for describing an example of obtaining a moving point of a cleaner from an obtained person region according to an embodiment of the present disclosure. Referring to FIG. 6, in operation S601, the processor 190 may extract one or more leg pairs from an obtained person region.

In an embodiment, the obtained person region may include a whole region of a person, or may include only a partial region, including a leg region, of the person. In operation S603, the processor 190 may determine whether a distance between leg regions included in the extracted leg pairs is within a certain distance. For example, when the distance between the leg regions included in the extracted leg pairs is within the certain distance, the processor 190 may recognize a corresponding leg pair as a leg pair of the same person.

For example, when the distance between the leg regions included in the extracted leg pairs exceeds the certain distance, the processor 190 may recognize that a corresponding leg pair is not a leg pair of the same person in operation S604. Here, the certain distance may be 80 cm, but this is merely a numerical value given as an example.

Figure 7:
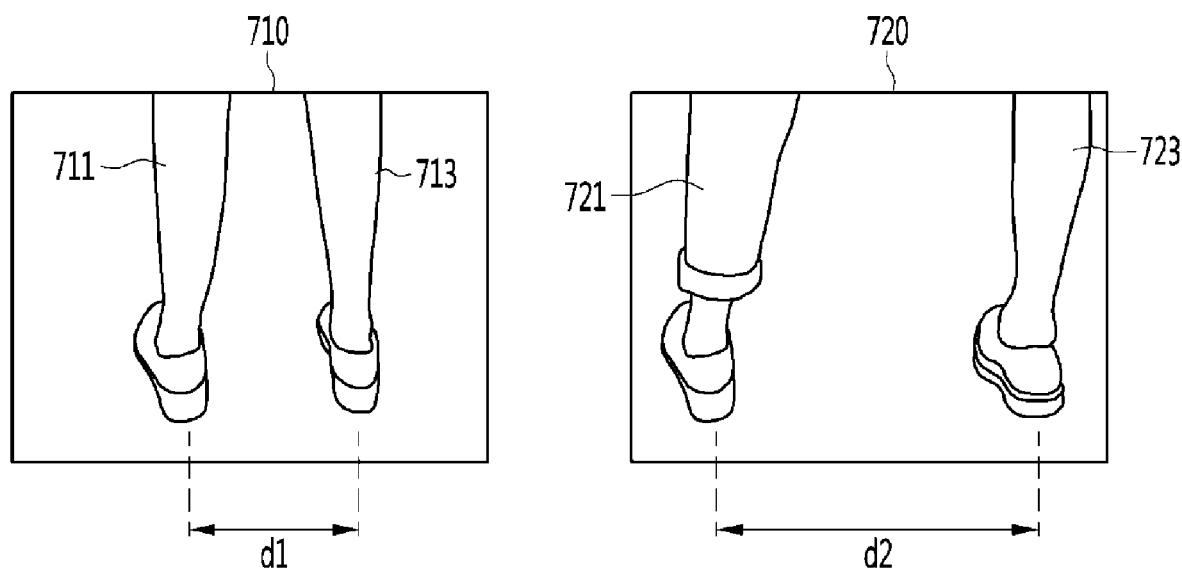
FIG. 7 is a diagram for describing an example of determining whether a leg pair is a leg pair of the same person, based on a distance between leg regions according to an embodiment of the present disclosure.

FIG. 7 is a diagram for describing an example of determining whether a leg pair is a leg pair of the same person, based on a distance between leg regions according to an embodiment of the present disclosure. Referring to FIG. 7, leg pairs 710 and 720 extracted from one person region are illustrated.

A first leg pair 710 may include a first leg region 711 and a second leg pair 713. A second leg pair 720 may include a third leg region 721 and a fourth leg pair 723.

The processor 190 may determine whether a first distance d1 between the first leg region 711 and the second leg pair 713 is within a certain distance. Here, the certain distance may be 80 cm. When the first distance d1 is within 80 cm, the processor 190 may determine that the first leg pair 710 is a leg pair of the same person.

The processor 190 may determine whether a second distance d2 between the third leg region 721 and the fourth leg pair 723 is within the certain distance. When the second distance d2 exceeds the certain distance, the processor 190 may recognize that the second leg pair 720 is not a leg pair of the same person. The processor 190 may remove the second leg pair 720 which is recognized as not a leg pair of the same person.

Through such a process, a follow target which the cleaner 100 needs to follow may become clear. FIG. 6 will be described again. The processor 190 may extract leg pairs where a distance between leg regions is within a certain distance, and may determine whether the number of the extracted leg pairs is two or more in operation S605.

When it is determined that the number of the extracted leg pairs is two or more, the processor 190 may select, as a follow target, a leg pair located at a distance closest to the depth sensor 111 included in the image information obtaining unit 110 in operation S607.

In an embodiment, the processor 190 may obtain distance data between each of the extracted leg pairs and the depth sensor 111. The processor 190 may obtain a distance between each of leg pairs and the depth sensor 111 by using distance data included in depth information about an object obtained through the depth sensor 111 in operation S201 of FIG. 2.

The processor 190 may select, as follow target which the cleaner needs to follow, a leg pair located at a distance closest to the depth sensor 111 among distances between the leg pairs and the depth sensor 111. The processor 190 may project a leg pair, selected as the follow target, onto a floor surface in operation S609.

Figure 8:
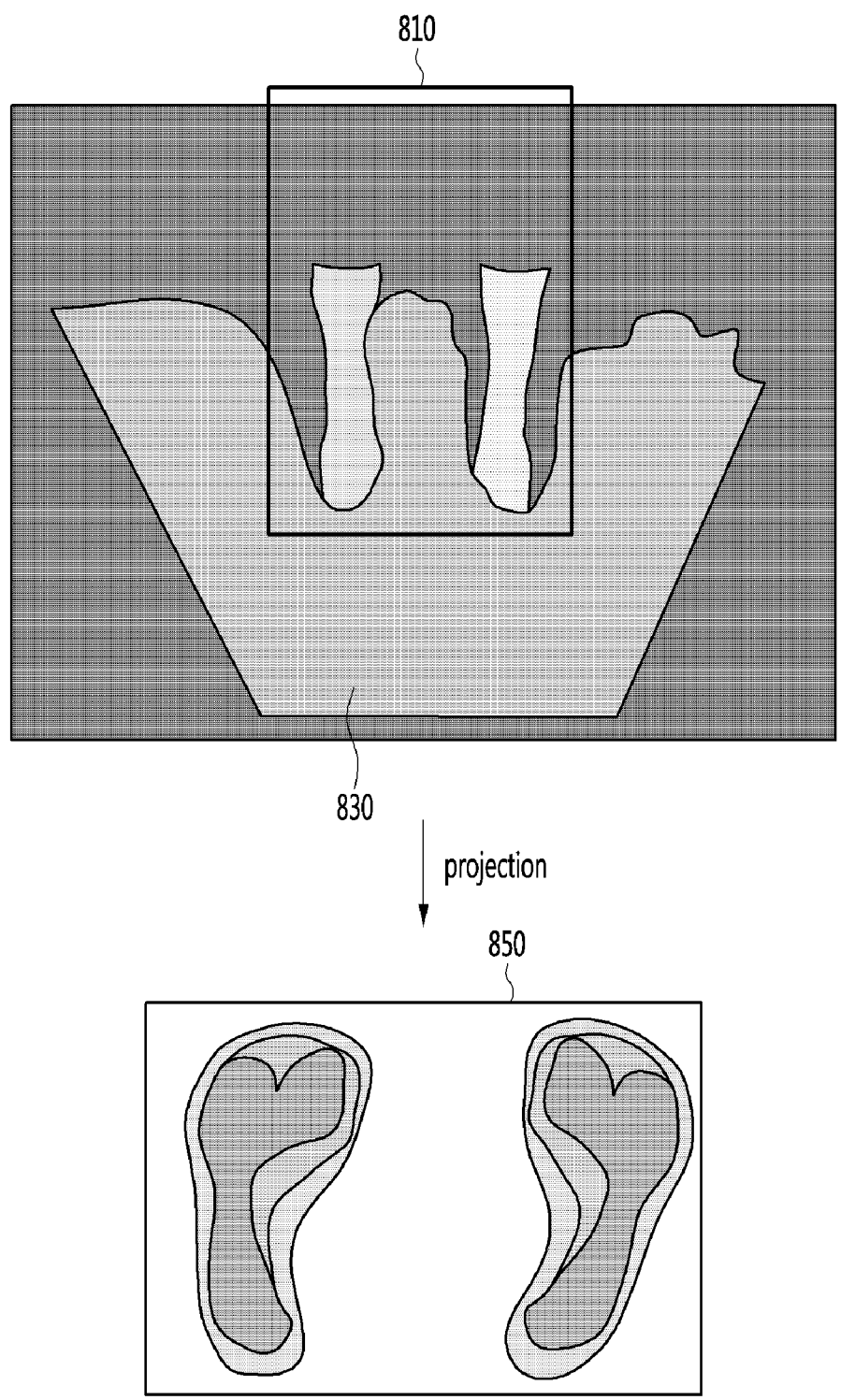
FIGS. 8 and 9 are diagrams for describing a process of projecting, by a cleaner, a leg pair selected as a follow target onto a floor surface to obtain a projected foot sole region according to an embodiment of the present disclosure.
Figure 9:
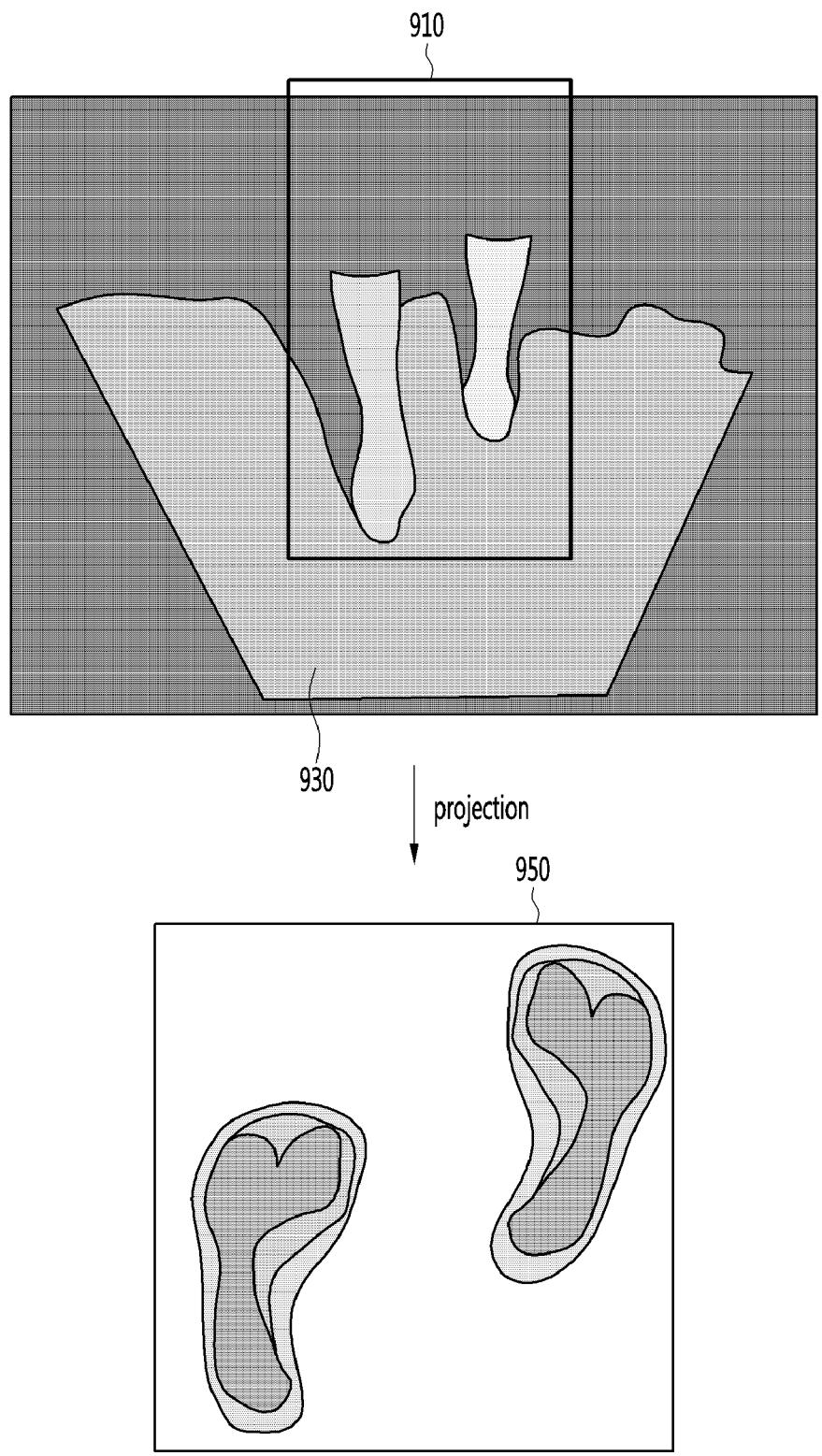

FIGS. 8 and 9 are diagrams for describing a process of projecting, by a cleaner, a leg pair selected as a follow target onto a floor surface to obtain a projected foot sole region according to an embodiment of the present disclosure. FIG. 8 is a diagram for describing a foot sole region obtained at a first time, and FIG. 9 is a diagram for describing a foot sole region obtained at a second time when a certain time elapses from the first time.

The processor 190 may project a first leg pair 810, selected as a follow target, onto a floor surface 830. Therefore, a first foot sole region 850 may be obtained. The first foot sole region 850 may be used to obtain a moving point to which the cleaner 100 should automatically move for following a person later.

Likewise, when a person who is a follow target of the cleaner 100 has moved, the processor 190 may project a second leg pair 910, selected as a follow target, onto a floor surface 930. Therefore, a second foot sole region 950 may be obtained. The second foot sole region 950 may be used to obtain a moving point to which the cleaner 100 should automatically move for following a person later.

FIG. 6 will be described again. The processor 190 may estimate a moving direction of a foot sole region corresponding to a leg pair obtained through projection in operation S611. The processor 190 may obtain a moving point of the cleaner 100 by using a relative position between the estimated moving direction and each of left and right foot sole regions in operation S613.

In an embodiment, the processor 190 may obtain a point to which the cleaner 100 needs to move, based on the relative position between the estimated moving direction and each of the left and right foot sole regions.

This will be described with reference to FIGS. 10 to 14. FIGS. 10 to 14 are diagrams for describing a process of obtaining a moving point of a cleaner by using a foot sole region according to an embodiment of the present disclosure. In FIGS. 10 to 14, a portion described as a target point may represent a moving point to which the cleaner 100 needs to move for automatically following a person.

Figure 10:
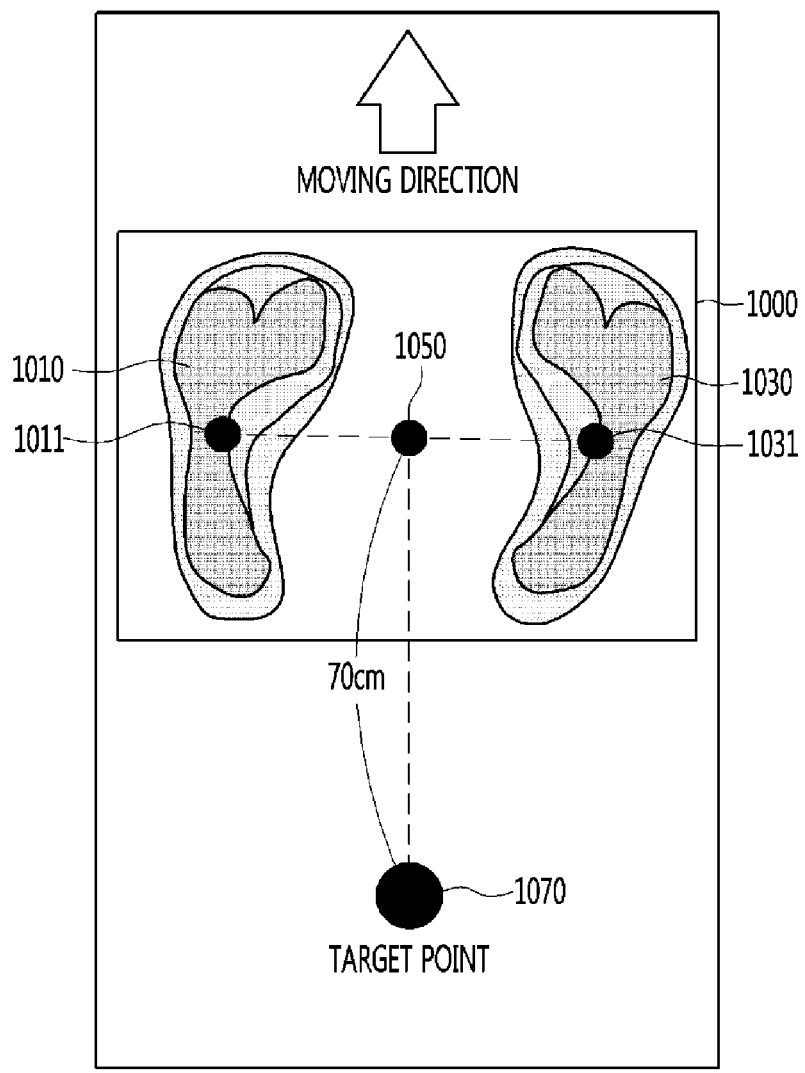
FIGS. 10 to 14 are diagrams for describing a process of obtaining a moving point of a cleaner by using a foot sole region according to an embodiment of the present disclosure.
Figure 10:
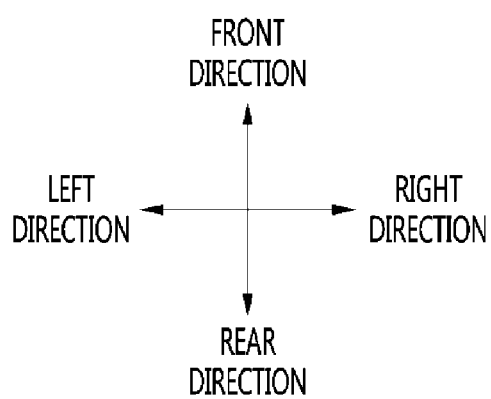

First, FIG. 10 will be described. FIG. 10 is a diagram for describing a method of selecting a moving point of the cleaner 100 when a left foot sole region and a right foot sole region face a front region. Referring to FIG. 10, a first foot sole region 1000 is illustrated. The first foot sole region 1000 may include a left foot sole region 1010 and a right foot sole region 1030.

The processor 190 may recognize a direction in which each of the left foot sole region 1010 and the right foot sole region 1030 faces, and may determine that the first foot sole region 1000 faces the front region, based on a result of the recognition. The processor 190 may estimate a moving direction of the foot sole region 1000 by using a shape of the left/right foot sole region. Since the moving direction of the foot sole region 1000 is estimated, a moving direction of a person may also be estimated. That is, the moving direction of the foot sole region 1000 may become a basis which enables the cleaner 100 to follow the person in a more accurate direction.

The processor 190 may obtain a center 1050 of a line which connects a center 1011 of the left foot sole region 1010 and a center 1031 of the right foot sole region 1030. The processor 190 may select, as a moving point of the cleaner 100, a point 1070 spaced apart from the center 1050 of the line by a certain distance in a direction (a rear region) opposite to a front region which is a moving direction of the person. Here, the certain distance may be a minimum distance which does not disturb following of a person. The certain distance may be 70 cm, but this is merely a numerical value given as an example.

The processor 190 may control the driving driver 170 to move the cleaner 100 to the selected moving point 1070. Hereinafter, FIG. 11 will be described. Particularly, FIG. 11 is a diagram for describing a method of selecting a moving point of the cleaner 100 when a left foot sole region and a right foot sole region face a front region, and the right foot sole region is located more forward than the left foot sole region.

Figure 11:
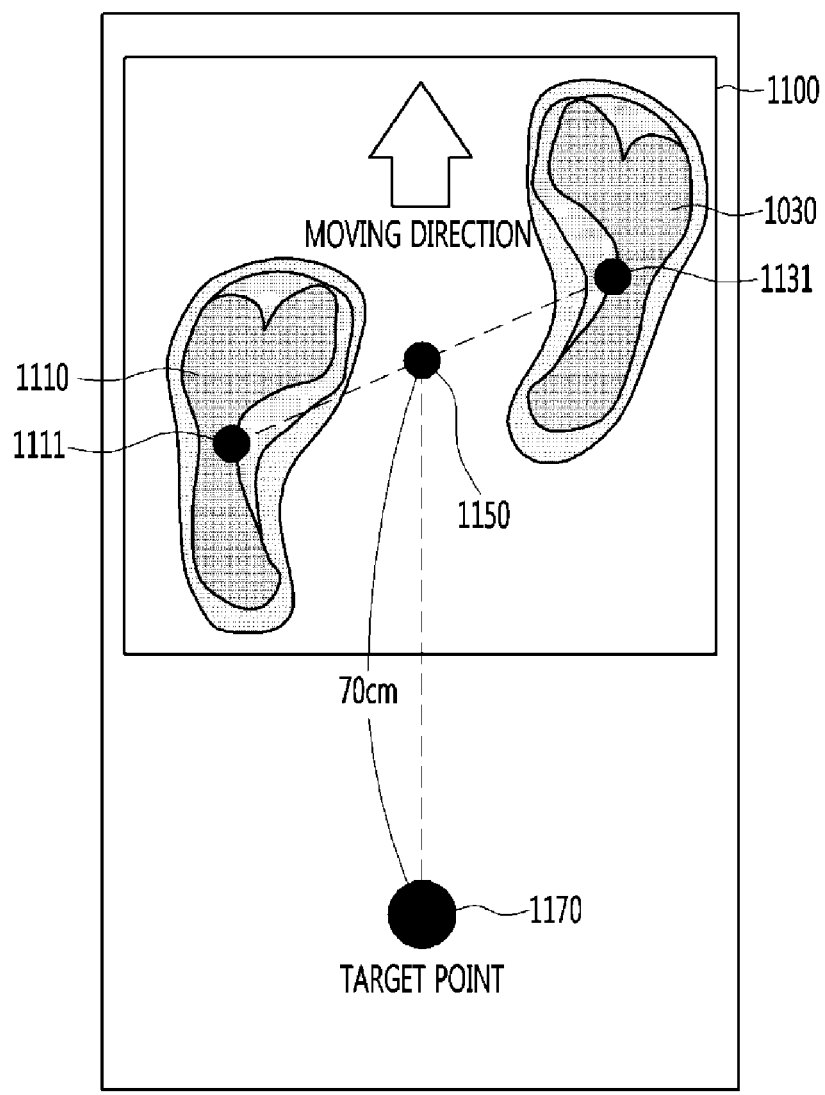

Referring to FIG. 11, a second foot sole region 1100 is illustrated. The second foot sole region 1100 may include a left foot sole region 1110 and a right foot sole region 1130. The processor 190 may recognize a direction in which each of the left foot sole region 1110 and the right foot sole region 1130 faces, and may determine that the second foot sole region 1100 faces the front region, based on a result of the recognition.

The processor 190 may obtain a center 1150 of a line which connects a center 1111 of the left foot sole region 1110 and a center 1131 of the right foot sole region 1130. The processor 190 may select, as a moving point of the cleaner 100, a point 1170 spaced apart from the center 1150 of the line by a certain distance in a direction (a rear region) opposite to a front region which is a moving direction of the person. The processor 190 may control the driving driver 170 to move the cleaner 100 to the selected moving point 1170.

Hereinafter, FIG. 12 will be described. Particularly, FIG. 12 is a diagram for describing a method of selecting a moving point of the cleaner 100 when a left foot sole region and a right foot sole region face a front region, and the left foot sole region is located more forward than the right foot sole region.

Figure 12:
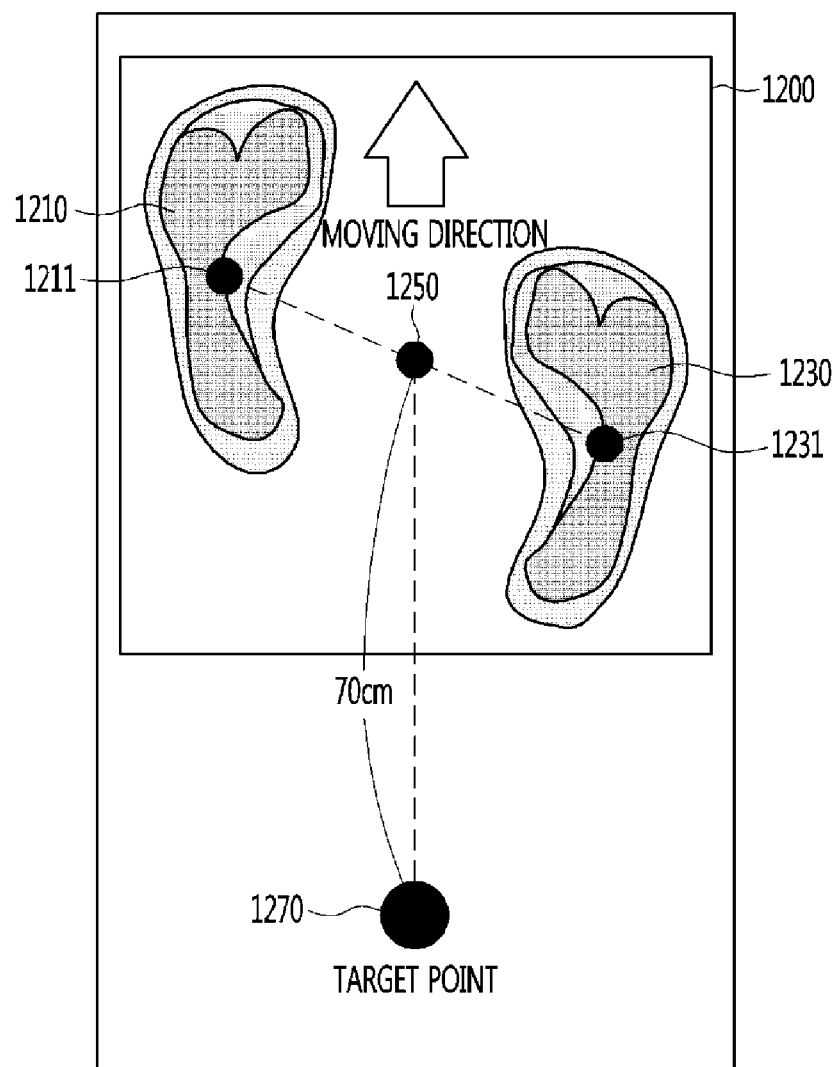

Referring to FIG. 12, a third foot sole region 1200 is illustrated. The third foot sole region 1200 may include a left foot sole region 1210 and a right foot sole region 1230. The processor 190 may recognize a direction in which each of the left foot sole region 1210 and the right foot sole region 1230 faces, and may determine that the third foot sole region 1200 faces the front region, based on a result of the recognition.

The processor 190 may obtain a center 1250 of a line which connects a center 1211 of the left foot sole region 1210 and a center 1231 of the right foot sole region 1230. The processor 190 may select, as a moving point of the cleaner 100, a point 1270 spaced apart from the center 1250 of the line by a certain distance in a direction (a rear region) opposite to a front region which is a moving direction of the person. The processor 190 may control the driving driver 170 to move the cleaner 100 to the selected moving point 1270.

Hereinafter, FIG. 13 will be described. Particularly, FIG. 13 is a diagram for describing a method of selecting a moving point of the cleaner 100 when a left foot sole region and a right foot sole region face a left front region.

Figure 13:
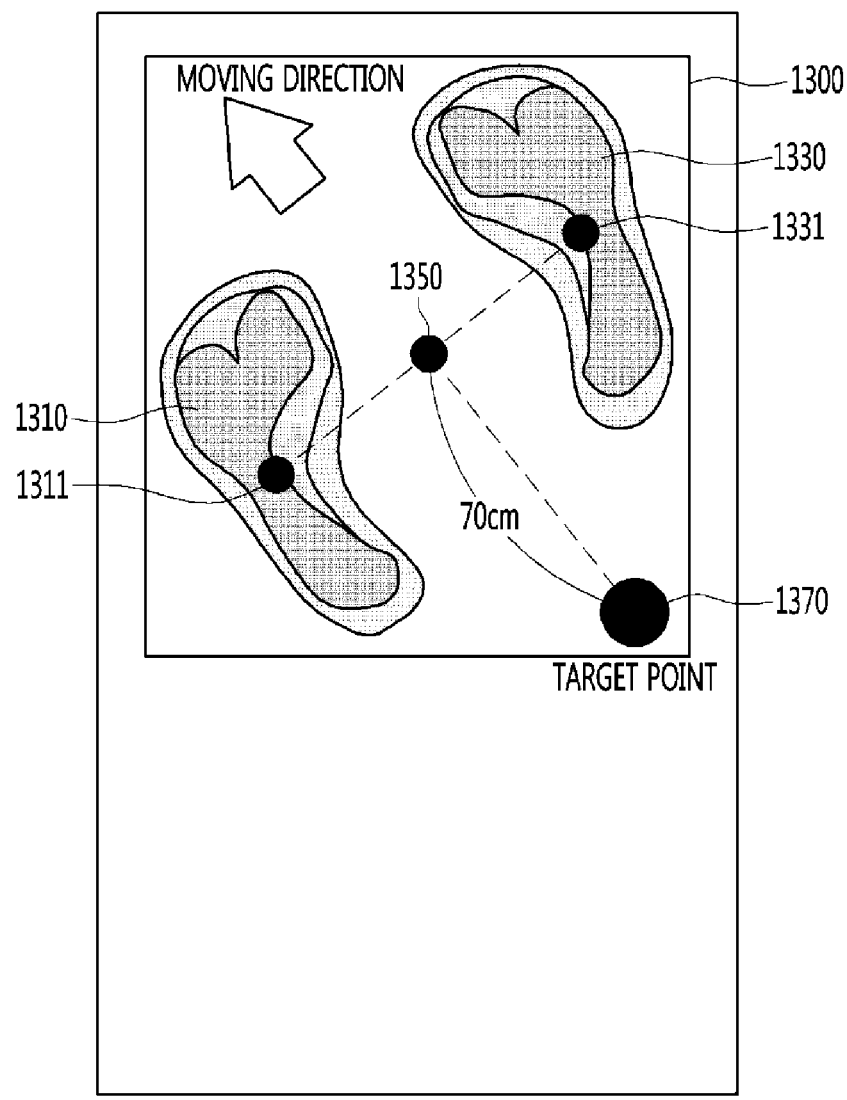
Figure 13:
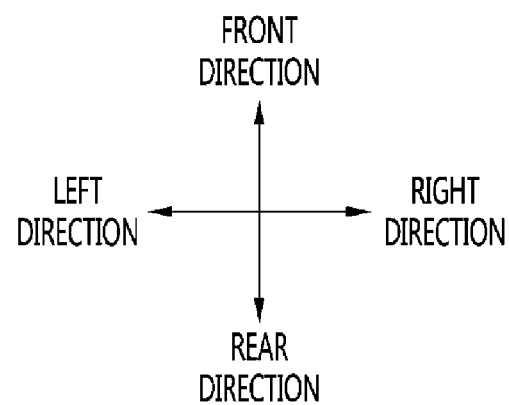

Referring to FIG. 13, a fourth foot sole region 1300 is illustrated. The fourth foot sole region 1300 may include a left foot sole region 1310 and a right foot sole region 1330.

The processor 190 may recognize a direction in which each of the left foot sole region 1310 and the right foot sole region 1330 faces, and may determine that the fourth foot sole region 1300 faces the left front region, based on a result of the recognition.

The processor 190 may obtain a center 1350 of a line which connects a center 1311 of the left foot sole region 1310 and a center 1331 of the right foot sole region 1330. The processor 190 may select, as a moving point of the cleaner 100, a point 1370 spaced apart from the center 1350 of the line by a certain distance in a direction (a right rear region) opposite to a left front region which is a moving direction of the person. The processor 190 may control the driving driver 170 to move the cleaner 100 to the selected moving point 1370.

Hereinafter, FIG. 14 will be described. Particularly, FIG. 14 is a diagram for describing a method of selecting a moving point of the cleaner 100 when a left foot sole region and a right foot sole region face a right front region.

Figure 14:
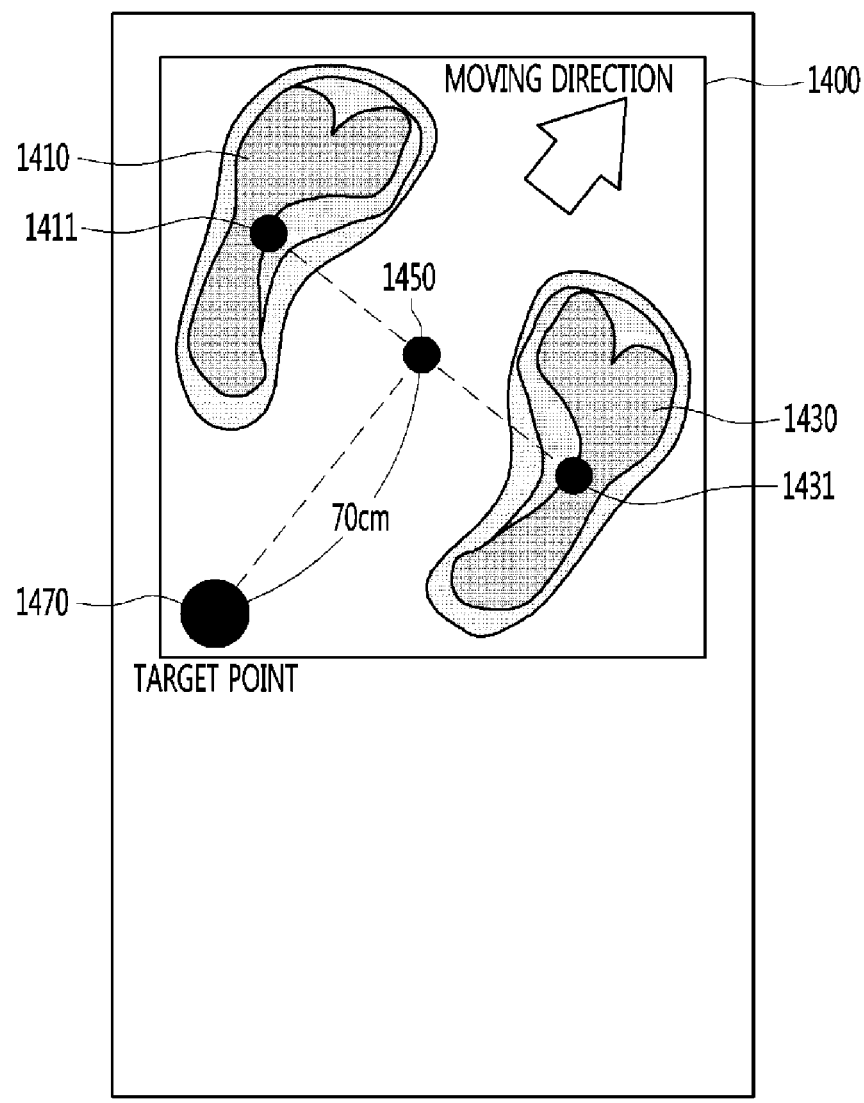
Figure 14:
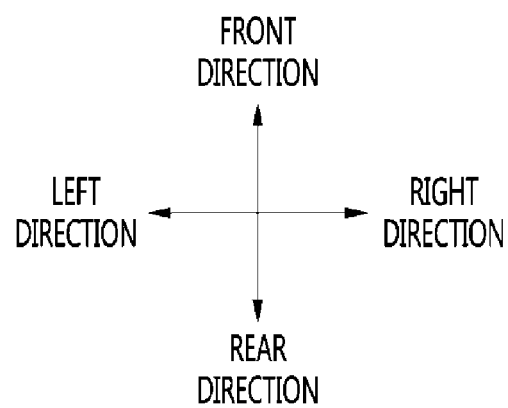

Referring to FIG. 14, a fifth foot sole region 1400 is illustrated. The fifth foot sole region 1400 may include a left foot sole region 1410 and a right foot sole region 1430.

The processor 190 may recognize a direction in which each of the left foot sole region 1410 and the right foot sole region 1430 faces, and may determine that the fourth foot sole region 1400 faces the right front region, based on a result of the recognition.

The processor 190 may obtain a center 1450 of a line which connects a center 1411 of the left foot sole region 1410 and a center 1431 of the right foot sole region 1430. The processor 190 may select, as a moving point of the cleaner 100, a point 1470 spaced apart from the center 1450 of the line by a certain distance in a direction (a left rear region) opposite to a right front region which is a moving direction of the person.

The processor 190 may control the driving driver 170 to move the cleaner 100 to the selected moving point 1470. When only one leg pair is extracted in operation S605, the processor 190 may select the extracted leg pair as a follow target in operation S606, and operation S609 and operations subsequent thereto may be performed.

The above-described present disclosure may be implemented as a code readable by computer (a computer-readable recording medium having information processing capabilities devices). The computer-readable recording medium includes all kinds of storage devices that store data readable by a computer system. Examples of computer-readable recording device include hard disk drive (HDD), solid state disk (SSD), silicon disk drive (SDD), read-only memory (ROM), random access memory (RAM), CD-ROM, magnetic tapes, floppy disks, and optical data storage devices.

The present disclosure provides a cleaner which accurately recognizes a person instead of a moving object and automatically follows the recognized person. The present disclosure provides a cleaner automatically follows a person to a position spaced apart from the person by a certain distance.

The present disclosure provides a cleaner which selects an accurate follow target from among person candidate regions. The present disclosure provides a cleaner which automatically avoids a region determined as an obstacle from among person candidate regions.

The present disclosure provides a cleaner which complements a case where a person candidate region is not detected due to an influence of an external environment. The present disclosure provides a cleaner which, without adding a human sensor sensing a human body, recognizes a person and automatically follows the recognized person.

A cleaner according to an embodiment of the present disclosure may move a cleaner body to a target point to which the cleaner body is to be moved, based on a foot sole region of a person extracted from image information obtained through a depth sensor.

A cleaner according to an embodiment of the present disclosure may obtain a moving point to which the cleaner is to be moved, based on a moving direction of a foot sole region and a relative position between a left foot sole region and a right foot sole region included in the foot sole region.

A cleaner according to an embodiment of the present disclosure may extract a person region from a person candidate region and may extract a foot sole region from the person region.

A cleaner according to an embodiment of the present disclosure may control a driving driver to avoid an obstacle when a person candidate region is determined as an obstacle.

A cleaner according to an embodiment of the present disclosure may extract a person candidate region through an RGB sensor when the person candidate region is not extracted through a depth sensor. In a cleaner according to an embodiment of the present disclosure, a depth sensor may be provided on an upper front surface of a cleaner body.

An additional applicable range of the present disclosure will become clear through the detailed disclosure. However, various modifications and corrections can be clearly understood by those skilled in the art without departing from the spirit and scope of the present disclosure, and thus, it should be understood that the detailed description and a specific embodiment such as an embodiment of the present disclosure are merely given as an example.

According to an embodiment of the present disclosure, a person who a cleaner needs to follow is accurately recognized, and the cleaner may stably follow the person. According to an embodiment of the present disclosure, since a cleaner is spaced apart from a rear region behind a user by a certain distance, the user may perform cleaning without disturbance, and a suction hose is not twisted.

According to an embodiment of the present disclosure, a cleaner accurately distinguishes an obstacle from a person region, and thus, is prevented from following an object instead of a person. According to an embodiment of the present disclosure, a cleaner automatically avoids an obstacle, and thus, damage caused by collision with an obstacle is prevented.

According to an embodiment of the present disclosure, a follow target may be extracted regardless of a change in external environment where a depth sensor is impossible to use. According to an embodiment of the present disclosure, since a separate human sensor for sensing a human body is not provided, the cost is reduced.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
a body;
a memory configured to store a person shape model including a leg pair image;
a motor configured to move the body through a region;
an image sensor configured to obtain image information about a portion of the region, wherein the image sensor includes a depth sensor configured to obtain depth information and an RGB sensor configured to obtain RGB information; and
a processor configured to:
extract a plurality of leg pairs which are respectively associated with a foot sole region in the region based on the obtained image information,
obtain a plurality of distance values between each of the plurality of leg pairs and the depth sensor,
select, as a follow target, a leg pair, of the plurality of leg pairs, that is located closest to the depth sensor based on the plurality of distance values,
determine a moving point based on a moving direction of the foot sole region of the selected leg pair and a relative position between a left foot sole region and a right foot sole region included in the foot sole region, and
control the motor to move the body to the moving point,
wherein the processor is further configured to:
determine that a person candidate region is not extracted by the RGB sensor if an ambient illuminance is less than a preset illuminance,
extract the person candidate region from a foreground region from which a background region has been separated based on the obtained depth information if the person candidate region is not extracted by the RGB sensor,
determine that the person candidate region is not extracted by the depth sensor if a light saturation of the depth sensor is detected,
extract the person candidate region using a histogram with respect to directions of edge pixels of a plurality of pixels which divide a color image corresponding to the RGB information if the person candidate region is not extracted by the depth sensor,
compare the person shape model stored in the memory with the person candidate region,
determine that the extracted person candidate region is a person region when a matching rate between the extracted person candidate region and the person shape model is equal to or greater than a predetermined matching rate, and
determine that the extracted person candidate region is an obstacle region when the extracted person candidate region is not the person region.

2. The robot of claim 1, wherein the processor obtains a point spaced apart from a center of a line, connecting a center of the left foot sole region and a center of the right foot sole region, by a certain distance in a direction opposite to the moving direction, and determines the point as the moving point.

3. The robot of claim 1, wherein, when processor determines that the extracted person candidate region is the person region, the processor further:
extracts moving regions that include a first moving region that is associated with the person region and a second moving region that is not associated with the person region, identifies the second moving region as the obstacle region, and
controls the motor so that the body avoids the obstacle region.

4. The robot of claim 1, wherein the depth sensor has at least one receptor to detect light reflected from the portion of the region, the receptor being selectively activated during different time periods, and
wherein the depth sensor generates the image information based on the respective amounts of light detected by the at least one receptor during the different time periods.

5. The robot of claim 4, wherein when the processor cannot extract a moving region through the image information obtained by the depth sensor, the processor extracts the moving region by using the color image information obtained by the RGB sensor.

6. The robot of claim 1, wherein the image sensor is provided on an upper front section of the body.

7. The robot of claim 1, wherein the robot further includes a suction head configured to suck in dust, and
wherein the suction head is separated from the body and is connected to the body by a suction hose.

8. A robot comprising:
a memory configured to store a person shape model including a leg pair image;
a motor configured to move the robot through a region;
a depth sensor configured to obtain depth information and identify respective distances between the robot and one or more legs within the region, wherein the legs are associated with at least one person;
an RGB sensor configured to obtain RGB information; and
a processor configured to control the motor to move the robot,
wherein the processor is further configured to:
extract a plurality of leg pairs which are respectively associated with a foot sole region in the region using the depth sensor, wherein the foot sole region includes a left foot sole region and a right foot sole region, obtain a plurality of distance values between each of the plurality of leg pairs and the depth sensor, select, as a follow target, a leg pair, of the plurality of leg pairs, that is located closest to the depth sensor based on the plurality of distance values, determine a moving point of the person based on a moving direction of the foot sole region of the selected leg pair and a relative position between a left foot sole region and a right foot sole region included in the foot sole region, determine that a person candidate region is not extracted by the RGB sensor if an ambient illuminance is less than a preset illuminance, extract the person candidate region from a foreground region from which a background region has been separated based on the obtained depth information if the person candidate region is not extracted by the RGB sensor, determine that the person candidate region is not extracted by the depth sensor if a light saturation of the depth sensor is detected, extract the person candidate region using a histogram with respect to directions of edge pixels of a plurality of pixels which divide a color image corresponding to the RGB information if the person candidate region is not extracted by the depth sensor, compare the person shape model stored in the memory with the person candidate region, determine that the extracted person candidate region is a person region when a matching rate between the extracted person candidate region and the person shape model is equal to or greater than a predetermined matching rate, and determine that the extracted person candidate region is an obstacle region when the extracted person candidate region is not the person region.

9. The robot of claim 8, wherein the processor further extracts the foot sole region of a person within the region based on the distance between the robot and the one or more legs, and identifies the moving point based on a moving direction of the extracted foot sole region and a relative position between the left foot sole region and the right foot sole region included in the foot sole region.

10. The robot of claim 9, wherein the processor obtains a point spaced apart from a center of a line, connecting a center of the left foot sole region and a center of the right foot sole region, by a certain distance in a direction opposite to the moving direction, and determines the point as the moving point.

11. The robot of claim 8, wherein, when processor determines that the extracted person candidate region is the person region, the processor further:

extracts moving regions that include a first moving region that is associated with the person region and a second moving region that is not associated with the person region, identifies the second moving region as the obstacle region, and controls the motor so that the robot avoids the obstacle region.

12. The robot of claim 8, wherein the depth sensor includes at least one receptor that detects light reflected from a portion of the region, the receptor being selectively activated during different time periods, and wherein the depth sensor generates image information about the portion of the region based on the respective amounts of light detected by the at least one receptor during the different time periods.

13. The robot of claim 12, wherein when a moving region is not extracted through the image information obtained by the depth sensor, the processor extracts the moving region by using the color image information obtained by the RGB sensor.

14. The robot of claim 8, wherein the depth sensor is provided on an upper front section of the robot.

15. The robot of claim 8, further comprising:

a sensor to detect a location of an obstacle within the region, wherein the processor further:

generates a map based on the location of the obstacle within the region, and directs the robot toward the moving point based on the map.

16. The robot of claim 8, further comprising:

a suction head that suctions dust.

* * * * *